US012693612B2

(12) United States Patent
Obukuro et al.

(10) Patent No.: US 12,693,612 B2
(45) Date of Patent: Jul. 28, 2026

(54) CARTRIDGE, IMAGE FORMING APPARATUS, DEVELOPING APPARATUS, AND TONER CARTRIDGE

(71) Applicant: CANON KABUSHIKI KAISHA, Tokyo (JP)

(72) Inventors: Yuuji Obukuro, Saitama (JP); Shunsuke Hijikata, Kanagawa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 19/060,966

(22) Filed: Feb. 24, 2025

(65) Prior Publication Data

US 2025/0271788 A1 Aug. 28, 2025

(30) Foreign Application Priority Data

Feb. 27, 2024 (JP) ................................ 2024-027430

(51) Int. Cl.
*G03G 15/08* (2006.01)
*G03G 15/00* (2006.01)
*G03G 21/18* (2006.01)

(52) U.S. Cl.
CPC ..... *G03G 15/0853* (2013.01); *G03G 15/0875* (2013.01); *G03G 15/556* (2013.01); *G03G 21/1814* (2013.01)

(58) Field of Classification Search
CPC ........... G03G 15/0853; G03G 15/0875; G03G 15/556; G03G 21/1814
See application file for complete search history.

(56) References Cited

U.S. PATENT DOCUMENTS 5,111,247 A * 5/1992 Nichols .............. G03G 15/0849 366/142
2006/0198643 A1* 9/2006 Kimura .............. G03G 15/0875 399/27

(Continued)

FOREIGN PATENT DOCUMENTS

JP S5963366 U * 4/1984
JP H0132049 Y2 * 10/1989

(Continued)

OTHER PUBLICATIONS

Co-pending U.S. Appl. No. 19/171,733, filed Apr. 7, 2025.

*Primary Examiner* — Sevan A Aydin
(74) *Attorney, Agent, or Firm* — Venable LLP

(57) ABSTRACT

A cartridge is provided that includes a first accommodating portion configured to accommodate toner, a first rotation shaft configured to be rotatable about a first rotation axis line, a first flexible member fixed to the first rotation shaft, a first magnetized member provided on the first flexible member, a second accommodating portion configured to accommodate toner to be supplied to the first accommodating portion and being aligned with the first accommodating portion in a first direction, a second rotation shaft configured to be rotatable about a second rotation axis line, a second flexible member fixed to the second rotation shaft, a second magnetized member provided on the second flexible member, and a magnetism sensing sensor provided between the first rotation axis line and the second rotation axis line in the first direction, and configured to sense magnetism in a sensing-capable range.

19 Claims, 15 Drawing Sheets

(56) References Cited

U.S. PATENT DOCUMENTS

| | | | | |
|---|---|---|---|---|
| 2009/0317105 | A1* | 12/2009 | Tsutsumi | G03G 15/0877 399/53 |
| 2023/0096202 | A1 | 3/2023 | Sato et al. | |
| 2023/0205128 | A1 | 6/2023 | Sugimoto et al. | |
| 2024/0337966 | A1 | 10/2024 | Sato et al. | |
| 2024/0361723 | A1 | 10/2024 | Sugimoto et al. | |
| 2025/0298339 | A1* | 9/2025 | Igawa | G03G 15/0849 |

FOREIGN PATENT DOCUMENTS

| | | | | | |
|---|---|---|---|---|---|
| JP | H06202475 | A | * | 7/1994 | |
| JP | 2002108086 | A | * | 4/2002 | |
| JP | 2004286849 | A | * | 10/2004 | G03G 15/0858 |
| JP | 2006-337757 | A | | 12/2006 | |
| JP | 3971330 | B2 | | 9/2007 | |
| JP | 2008129422 | A | * | 6/2008 | |
| JP | 2010002591 | A | * | 1/2010 | G03G 15/0879 |
| JP | 2010175768 | A | * | 8/2010 | |
| JP | 2016-142949 | A | | 8/2016 | |
| JP | 2017-044906 | A | | 3/2017 | |
| JP | 2017151433 | A | * | 8/2017 | |
| JP | 2018151503 | A | * | 9/2018 | |
| JP | 2025145606 | A | * | 10/2025 | G03G 15/00 |
| WO | WO-2004083965 | A1 | * | 9/2004 | G03G 15/0875 |
| WO | WO-2021178093 | A1 | * | 9/2021 | G03G 15/0853 |

* cited by examiner

CARTRIDGE, IMAGE FORMING APPARATUS, DEVELOPING APPARATUS, AND TONER CARTRIDGE

BACKGROUND OF THE INVENTION

Field of the Invention

The present invention relates to an electrophotographic image forming apparatus such as a photocopier, printer, or the like, which employ an electrophotographic system, a developing apparatus which is used in the electrophotographic image forming apparatus, and a cartridge which is capable of being attached to and detached from the electrophotographic image forming apparatus.

Description of the Related Art

In an image forming apparatus that employs the electrophotographic system, a surface of an electrophotographic photosensitive member (hereinafter referred to as "photosensitive drum") is uniformly charged by charging means, and an electrostatic latent image is formed, with the surface of the photosensitive drum, which is charged, being exposed by exposing means. This electrostatic latent image is then developed by a developing apparatus and a developer image (hereinafter also referred to as "toner image") is formed of developer (hereinafter also referred to as "toner") on the photosensitive drum, and this toner image is transferred onto a recording material by transfer means. Thereafter, the toner image is heated by fixing means, and is thus fixed upon the recording material.

As such an image forming apparatus, an image forming apparatus that is configured such that an amount of developer within a container that holds the developer can be sensed is known. Japanese Patent No. 3971330 and Japanese Examined Utility Model Application Publication No. H 01-032049 disclose a configuration that is equipped with a magnetized member that is magnetized and a sensor for sensing the magnetism thereof, and that senses the amount of developer on the basis of sensing results of the sensor. FIGS. 14 and 15 of the present disclosure illustrate a configuration example of sensing the amount of developer using the magnetized member. FIG. 14 illustrates a toner cartridge 70 that is detachably attachable to an image forming apparatus, this toner cartridge 70 being equipped with a magnetized member 71 that is disposed inside of a toner accommodating portion, and a detecting portion 72 that detects this member. Also, FIG. 15 illustrates a remaining toner amount sensing apparatus 80 (toner hopper) that is equipped with a magnetized member 81 disposed inside of a toner accommodating portion, and a detecting portion 82 that detects this member.

SUMMARY OF THE INVENTION

An object of the present invention is to provide technology that enables sensing of an amount of developer while conserving space.

In order to achieve the above object, a cartridge according to the present application is a cartridge that detachably attachable to an image forming apparatus, the cartridge including:

- a first accommodating portion configured to accommodate toner;
- a first rotation shaft provided inside of the first accommodating portion and configured to be rotatable about a first rotation axis line;
- a first flexible member extending in a direction intersecting the first rotation axis line, the first flexible member having a first fixed end that is fixed to the first rotation shaft, and a first free end opposite to the first fixed end in the direction intersecting the first rotation axis line;
- a first magnetized member provided in a region of the first flexible member between the first fixed end and the first free end of the first flexible member, including the first free end;
- a second accommodating portion configured to accommodate toner to be supplied to the first accommodating portion, the second accommodating portion being aligned with the first accommodating portion in a first direction;
- a second rotation shaft provided inside of the second accommodating portion and configured to be rotatable about a second rotation axis line;
- a second flexible member extending in a direction intersecting the second rotation axis line, the second flexible member having a second fixed end that is fixed to the second rotation shaft, and a second free end opposite to the second fixed end in the direction intersecting the second rotation axis line;
- a second magnetized member provided in a region of the second flexible member between the second fixed end and the second free end of the second flexible member, including the second free end; and
- a magnetism sensing sensor provided between the first rotation axis line and the second rotation axis line in the first direction, and configured to sense magnetism in a sensing-capable range.

Also, in order to achieve the above object, an image forming apparatus according to the present application includes:

- an apparatus main body; and
- a cartridge configured to be detachably attachable to the apparatus main body, the cartridge including
  - a first accommodating portion configured to accommodate toner,
  - a first rotation shaft provided inside of the first accommodating portion and configured to be rotatable about a first rotation axis line;
  - a first flexible member extending in a direction intersecting the first rotation axis line, the first flexible member having a first fixed end that is fixed to the first rotation shaft, and a first free end opposite to the first fixed end in the direction intersecting the first rotation axis line;
  - a first magnetized member provided in a region of the first flexible member between the first fixed end and the first free end of the first flexible member, including the first free end;
  - a second accommodating portion configured to accommodate toner to be supplied to the first accommodating portion, the second accommodating portion being aligned with the first accommodating portion in a first direction;
  - a second rotation shaft provided inside of the second accommodating portion and configured to be rotatable about a second rotation axis line;
  - a second flexible member extending in a direction intersecting the second rotation axis line, the second flexible member having a second fixed end that is fixed to the second rotation shaft, and a second free end opposite to the second fixed end in the direction intersecting the second rotation axis line;

a second magnetized member provided in a region of the second flexible member between the second fixed end and the second free end of the second flexible member, including the second free end; and a magnetism sensing sensor provided between the first rotation axis line and the second rotation axis line in the first direction, and configured to sense magnetism in a sensing-capable range.

Also, in order to achieve the above object, an image forming apparatus according to the present application includes:

an image bearing member on which an electrostatic latent image is formed;

a toner bearing member configured to bear toner for developing the electrostatic latent image;

a first accommodating portion that accommodates the toner to be supplied to the toner bearing member;

a first rotation shaft that is provided inside of the first accommodating portion and that is configured to be rotatable about a first rotation axis line;

a first flexible member that extends in a direction intersecting the first rotation axis line, the first flexible member having a first fixed end that is fixed to the first rotation shaft, and a first free end opposite to the first fixed end in the direction intersecting the first rotation axis line;

a first magnetized member that is provided in a region of the first flexible member between the first fixed end of the first flexible member and the first free end thereof, including the first free end;

a second accommodating portion that accommodates toner to be supplied to the first accommodating portion, the second accommodating portion being aligned with the first accommodating portion in a first direction;

a second rotation shaft that is provided inside of the second accommodating portion and that is configured to be rotatable about a second rotation axis line;

a second flexible member that extends in a direction intersecting the second rotation axis line, the second flexible member having a second fixed end that is fixed to the second rotation shaft, and a second free end opposite to the second fixed end in the direction intersecting the second rotation axis line;

a second magnetized member that is provided in a region of the second flexible member between the second fixed end of the second flexible member and the second free end thereof, including the second free end; and a magnetism sensing sensor that is provided between the first rotation axis line and the second rotation axis line in the first direction, and that senses magnetism in a sensing-capable range.

Also, in order to achieve the above object, a developing apparatus according to the present application includes:

a developing member;

a first accommodating portion configured to accommodate toner;

a first rotation shaft provided inside of the first accommodating portion and configured to be rotatable about a first rotation axis line;

a first flexible member extending in a direction intersecting the first rotation axis line, the first flexible member having a first fixed end that is fixed to the first rotation shaft, and a first free end opposite to the first fixed end in the direction intersecting the first rotation axis line;

a first magnetized member provided in a region between the first fixed end of the first flexible member and the first free end of the first flexible member, including the first free end; and a magnetism sensing sensor configured to sense magnetism in a sensing-capable range, wherein the developing apparatus is configured such that a cartridge is detachably attachable, the cartridge including a second accommodating portion accommodating toner to be supplied to the first accommodating portion, a second rotation shaft provided inside of the second accommodating portion and configured to be rotatable about a second rotation axis line, a second flexible member extending in a direction intersecting the second rotation axis line, the second flexible member having a second fixed end that is fixed to the second rotation shaft, and a second free end opposite to the second fixed end in the direction intersecting the second rotation axis line, and a second magnetized member provided in a region of the second flexible member between the second fixed end and the second free end of the second flexible member, including the second free end, wherein the first accommodating portion is aligned with the second accommodating portion in a first direction, in an orientation in which the cartridge is attached to the developing apparatus, and wherein the cartridge is attached such that the magnetism sensing sensor is located between the first rotation axis line and the second rotation axis line in the first direction.

Also, in order to achieve the above object, a toner cartridge according to the present application is a toner cartridge configured to be detachably attachable to a developing apparatus that includes a developing member, a first accommodating portion configured to accommodate toner, a first rotation shaft provided inside of the first accommodating portion and configured to be rotatable about a first rotation axis line, a first flexible member extending in a direction intersecting the first rotation axis line and having a first fixed end that is fixed to the first rotation shaft, and a first free end opposite to the first fixed end in the direction intersecting the first rotation axis line, a first magnetized member provided in a region of the first flexible member between the first fixed end and the first free end of the first flexible member, including the first free end and a magnetism sensing sensor configured to sense magnetism in a sensing-capable range, the toner cartridge comprising:

a second accommodating portion configured to accommodate toner to be supplied to the first accommodating portion, the second accommodating portion being aligned with the first accommodating portion in a first direction in an orientation in which the toner cartridge is attached to the developing apparatus;

a second rotation shaft provided inside of the second accommodating portion and configured to be rotatable about a second rotation axis line;

a second flexible member extending in a direction intersecting the second rotation axis line, the second flexible member having a second fixed end that is fixed to the second rotation shaft, and a second free end opposite to the second fixed end in the direction intersecting the second rotation axis line; and a second magnetized member provided in a region of the second flexible member between the second fixed end and the second free end thereof of the second flexible member, including the second free end, wherein the magnetism sensing sensor is attached to the developing apparatus so as to be located between the first rotation axis line and the second rotation axis line in the first direction.

According to the present invention, an amount of developer can be sensed while conserving space.

Further features of the present invention will become apparent from the following description of exemplary embodiments with reference to the attached drawings.

DESCRIPTION OF THE EMBODIMENTS

Hereinafter, a description will be given, with reference to the drawings, of various exemplary embodiments (examples), features, and aspects of the present disclosure. However, the sizes, materials, shapes, their relative arrangements, or the like of constituents described in the embodiments may be appropriately changed according to the configurations, various conditions, or the like of apparatuses to which the disclosure is applied. Therefore, the sizes, materials, shapes, their relative arrangements, or the like of the constituents described in the embodiments do not intend to limit the scope of the disclosure to the following embodiments.

In the following description, the term "electrophotographic image forming apparatus" (hereinafter, also referred to as "image forming apparatus") means an arrangement by which images are formed on a sheet-like recording medium such as paper, using an electrophotographic image forming system. Examples of an image forming apparatus include a photocopier, a facsimile apparatus, a printer (laser beam printer, light-emitting diode (LED) printer, or the like), an all-in-one machine (multifunction printer), and so forth. Also, in the following description, the term "developing apparatus" means a unit that is used in the aforementioned image forming apparatus, and that has process means that acts on a photosensitive member (e.g., a charging member, a developing member, a cleaning member, and so forth), for example. Also, in the following description, the term "cartridge" is a unit that is detachably attachable to the aforementioned image forming apparatus, and that has means that acts on the photosensitive member (e.g., charging member, developing member, toner, cleaning member, and so forth).

First Embodiment

A first embodiment of the present invention will be described below with reference to the drawings. In the first embodiment, an image forming apparatus regarding which four toner cartridges and four process cartridges are detachably attachable is exemplified as the image forming apparatus. Note that the number of toner cartridges and process cartridges that are attached to the image forming apparatus is not limited to this number. The number thereof is to be set as appropriate in accordance with necessity. Also, a laser beam printer is exemplified as a form of the image forming apparatus in the embodiments described below.

Schematic Configuration of Image Forming Apparatus

Figure 2:
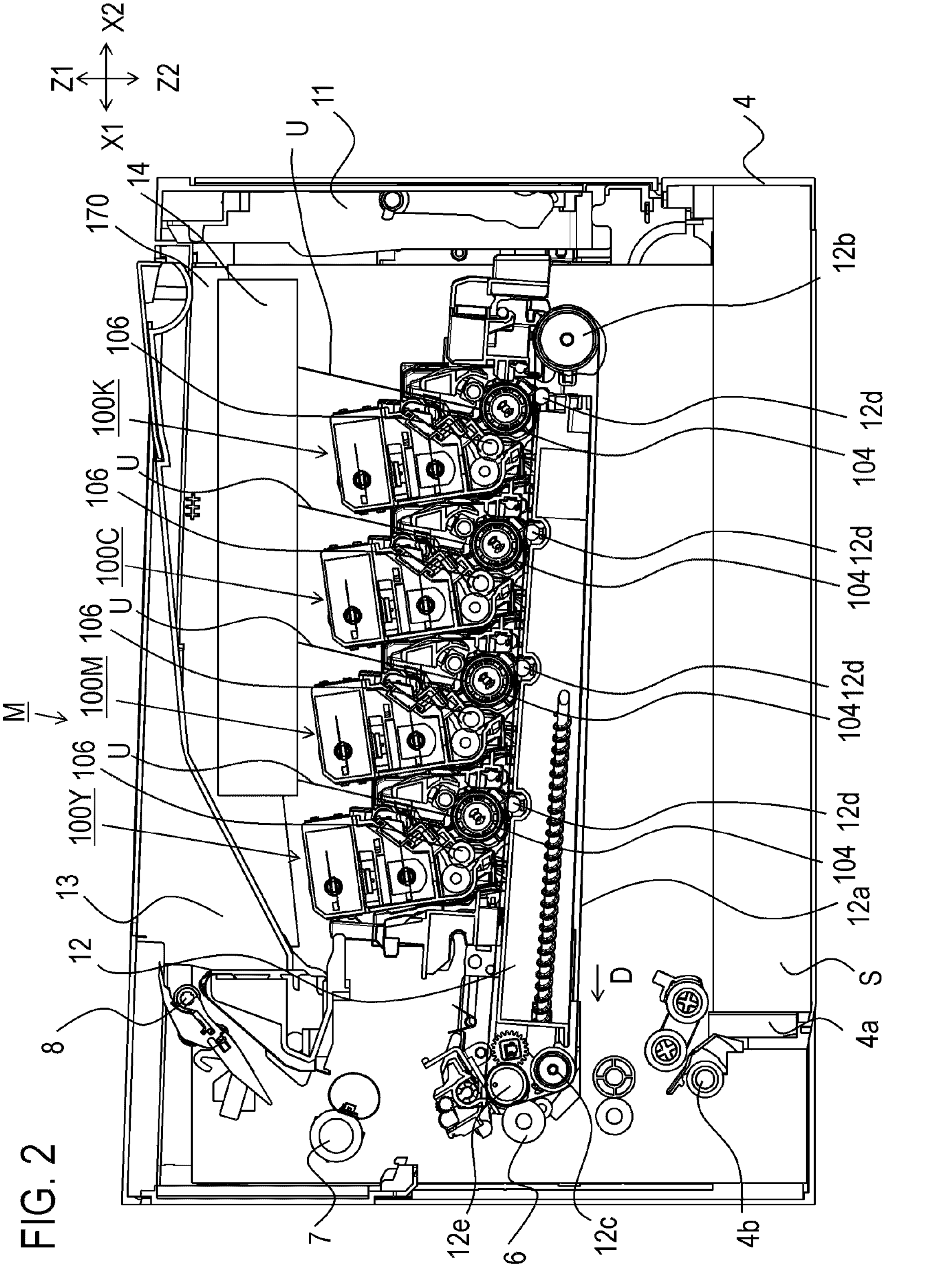
FIG. 2 is a schematic cross-sectional view of an image forming apparatus according to the first embodiment.

FIG. 2 is a cross-sectional schematic view of the image forming apparatus M according to the first embodiment. FIG. 2 also illustrates a cross-section of cartridges 100 that are attached to the image forming apparatus M. The image forming apparatus M is a four-color full-color laser printer using an electrophotographic process, and performs color image formation on a recording medium S. The image forming apparatus M is an electrophotographic recording system, in which the cartridges are removably attached to an apparatus main body 170 of the image forming apparatus M to form color images on the recording medium S.

The image forming apparatus M is equipped with a front door 11 that is capable of opening and closing with respect to the apparatus main body 170. Hereinafter, with respect to the image forming apparatus M, a side on which the front door 11 is provided will be referred to as "front face side", and a face on a side opposite from the front face as "rear face side". Also, a left side in a width direction (lateral direction) when viewing the image forming apparatus M from the front face will be referred to as "non-driving side", and the right side as "driving side". Also, an upper side when viewing the image forming apparatus M installed on a level face from the front will be referred to as "upper side", and a lower side as "lower side". FIG. 2 is a cross-sectional view, viewing the image forming apparatus M from the non-driving side, in which a near side from the plane of the drawing is the non-driving side of the image forming apparatus M, a far side from the plane of the drawing is the driving side of the image forming apparatus M, the right side in the plane of the drawing is the front face side of the image forming apparatus M, and the left side in the plane of the drawing is the rear face side of the image forming apparatus M.

Hereinafter, of depthwise directions of the image forming apparatus M, a direction toward the rear face is an X1 direction, and a direction toward the front face is an X2 direction. Also, an upward direction is a Z1 direction, and a downward direction is a Z2 direction. Also, of the width directions of the image forming apparatus M, a direction toward the driving side is a Y1 direction, and a direction toward the non-driving side is a Y2 direction. In the first embodiment, the directions X1, X2, Y1, and Y2 are substantially level directions.

Four cartridges 100 (100Y, 100M, 100C, 100K) are disposed in the apparatus main body 170, arrayed in a substantially level direction (depthwise direction). The four cartridges 100 (100Y, 100M, 100C, 100K) each have electrophotographic process mechanisms that are the same as each other, with colors of the developer (hereinafter referred to as "toner") differing. Hereinafter, when there is no need to distinguish among the four cartridges 100 (100Y, 100M, 100C, 100K), these may simply be referred to as "cartridge 100".

Rotational driving force is transmitted from a drive output portion of the apparatus main body 170 to the cartridges 100. The drive output portion of the apparatus main body 170 will be described in detail later. Also, bias voltage (charging bias, developing bias, and so forth) is supplied from the apparatus main body 170 to the cartridges 100.

The cartridge 100Y accommodates yellow (Y) toner, and forms yellow toner images on a surface of a photosensitive drum 104. The cartridge 100M accommodates magenta (M) toner, and forms magenta toner images on the surface of the photosensitive drum 104. The cartridge 100C accommodates cyan (C) toner, and forms cyan toner images on the surface of the photosensitive drum 104. The cartridge 100K accommodates black (K) toner, and forms black toner images on the surface of the photosensitive drum 104.

A laser scanner unit 14 is provided upward from the four cartridges 100 (100Y, 100M, 100C, 100K), as exposing means. This laser scanner unit 14 outputs laser light U in accordance with image information.

A intermediate transfer unit 12 is provided downward from the four cartridges 100 (100Y, 100M, 100C, 100K), as a transfer member. This intermediate transfer unit 12 has a driving roller 12_e_, a turn roller 12_c_, and a tension roller 12_b_ over which a transfer belt 12_a_, which is flexible, is run.

The photosensitive drum 104, serving as an image bearing member on which electrostatic latent images are formed, is provided in each cartridge 100. The photosensitive drum 104 is a rotating body that is configured so as to be rotatable about a rotation axis line that is parallel to the width direction. A lower face of the photosensitive drum 104 is in contact with an upper face of the transfer belt 12_a_. A contact portion of the photosensitive drum 104 and the transfer belt 12_a_ is a primary transfer portion. A primary transfer roller 12_d_ is provided corresponding to each cartridge 100, on an inner side of the transfer belt 12_a_ at a position facing the photosensitive drum 104.

A secondary transfer roller 6 abuts the driving roller 12_e_ across the transfer belt 12_a_. A contact portion of the transfer belt 12_a_ and the secondary transfer roller 6 is a secondary transfer portion.

A sheet feed unit 4 is provided downward from the intermediate transfer unit 12. The sheet feed unit 4 has a sheet feed tray 4_a_ that accommodates the recording medium S stacked therein, and a sheet feed roller 4_b_.

A fixing apparatus 7 and a sheet discharging apparatus 8 are provided to the upper left within the apparatus main body 170 in FIG. 2. An upper face of the apparatus main body 170 makes up a sheet discharge tray 13.

Image Forming Operations

Next, image forming operations for the image forming apparatus M to form full-color images will be described. Upon image forming operations being started, first, the photosensitive drums 104 of the four cartridges 100 (100Y, 100M, 100C, 100K) are rotationally driven clockwise in FIG. 2, at a predetermined speed. Also, the driving roller 12_e_ is rotationally driven by a motor (omitted from illustration) of the apparatus main body 170, and accordingly the transfer belt 12_a_ moves in a direction of an arrow D in FIG. 2.

Next, in each of the cartridges 100, a charging roller 105 uniformly charges the surface of the photosensitive drum 104 to a predetermined polarity and potential. The laser scanner unit 14 scans and exposes the surface of each of the photosensitive drums 104 by the laser light U in accordance with image signals of the respective colors. Accordingly, electrostatic latent images in accordance with the image signals of corresponding colors are formed on the surfaces of the respective photosensitive drums 104 that are image bearing members. The electrostatic latent images that are formed are then developed by developing rollers 106 that are rotationally driven at a predetermined speed. The developing rollers 106 are toner bearing members that bear toner for developing the electrostatic latent images.

The electrophotographic image forming process operations described above form a yellow toner image corresponding to a yellow component of the full-color image on the photosensitive drum 104 of the cartridge 100Y. Primary transfer of this toner image onto the transfer belt 12_a_ is then performed.

In the same way, a magenta toner image corresponding to a magenta component of the full-color image is formed on the photosensitive drum 104 of the cartridge 100M. Primary transfer of this toner image is then performed, so as to be superimposed onto the yellow toner image that is already transferred onto the transfer belt 12_a_.

In the same way, a cyan toner image corresponding to a cyan component of the full-color image is formed on the photosensitive drum 104 of the cartridge 100C. Primary transfer of this toner image is then performed, so as to be superimposed onto the yellow and magenta toner images that are already transferred onto the transfer belt 12_a_.

In the same way, a black toner image corresponding to a black component of the full-color image is formed on the photosensitive drum 104 of the cartridge 100K. Primary transfer of this toner image is then performed, so as to be superimposed onto the yellow, magenta, and cyan toner images that are already transferred onto the transfer belt 12_a_.

Thus, a four-color full-color unfixed toner image of yellow, magenta, cyan, and black is formed on the transfer belt 12_a_.

Meanwhile, the recording medium S is separated and fed at a predetermined control timing, one sheet at a time. The recording medium S is guided to the secondary transfer portion, which is the contact portion of the secondary transfer roller 6 and the transfer belt 12_a_, at a predetermined control timing. Thus, the four-color superimposed toner image on the transfer belt 12_a_ is progressively transferred together onto a face of the recording medium S, in a process of the recording medium S being conveyed to the secondary transfer portion.

The recording medium S onto which the toner image is transferred then has the toner image fixed by fixing means that the fixing apparatus 7 is equipped with, and is discharged to the sheet discharge tray 13 by the sheet discharging apparatus 8.

Cartridge Attaching/Detaching Configuration

Figure 3:
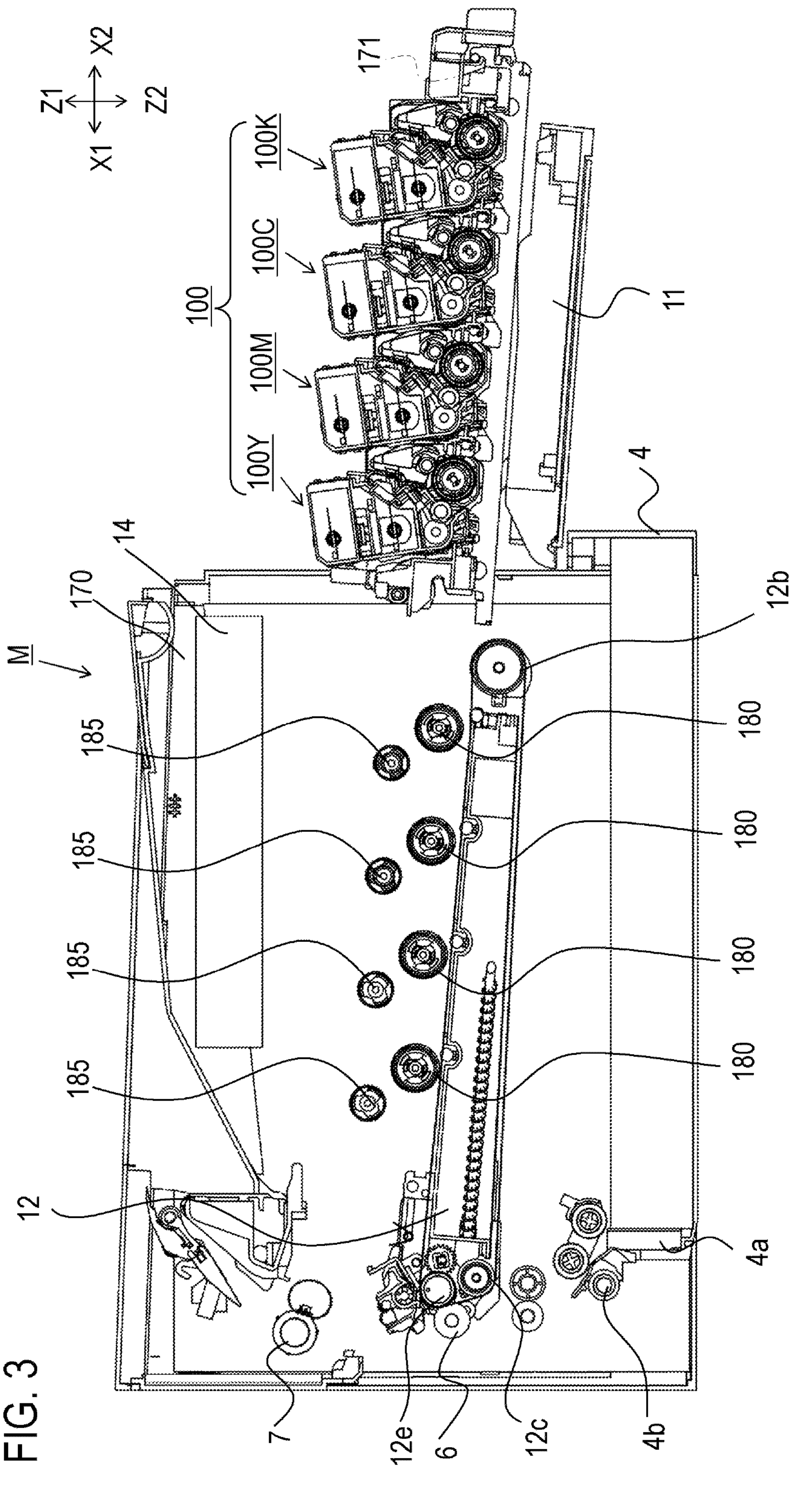
FIG. 3 is a schematic cross-sectional view of the image forming apparatus according to the first embodiment.
Figure 4:
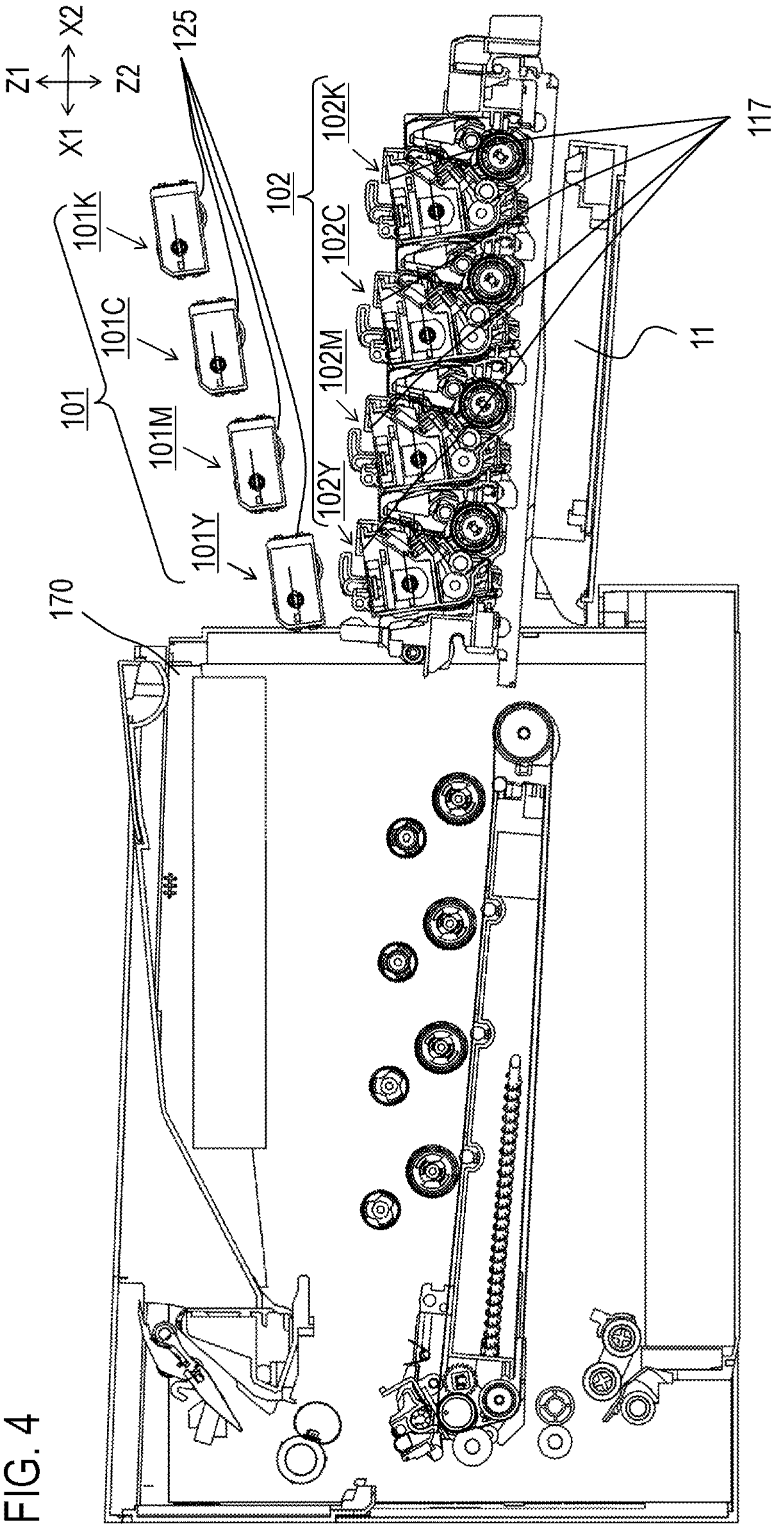
FIG. 4 is a schematic cross-sectional view of the image forming apparatus according to the first embodiment.
Figure 5:
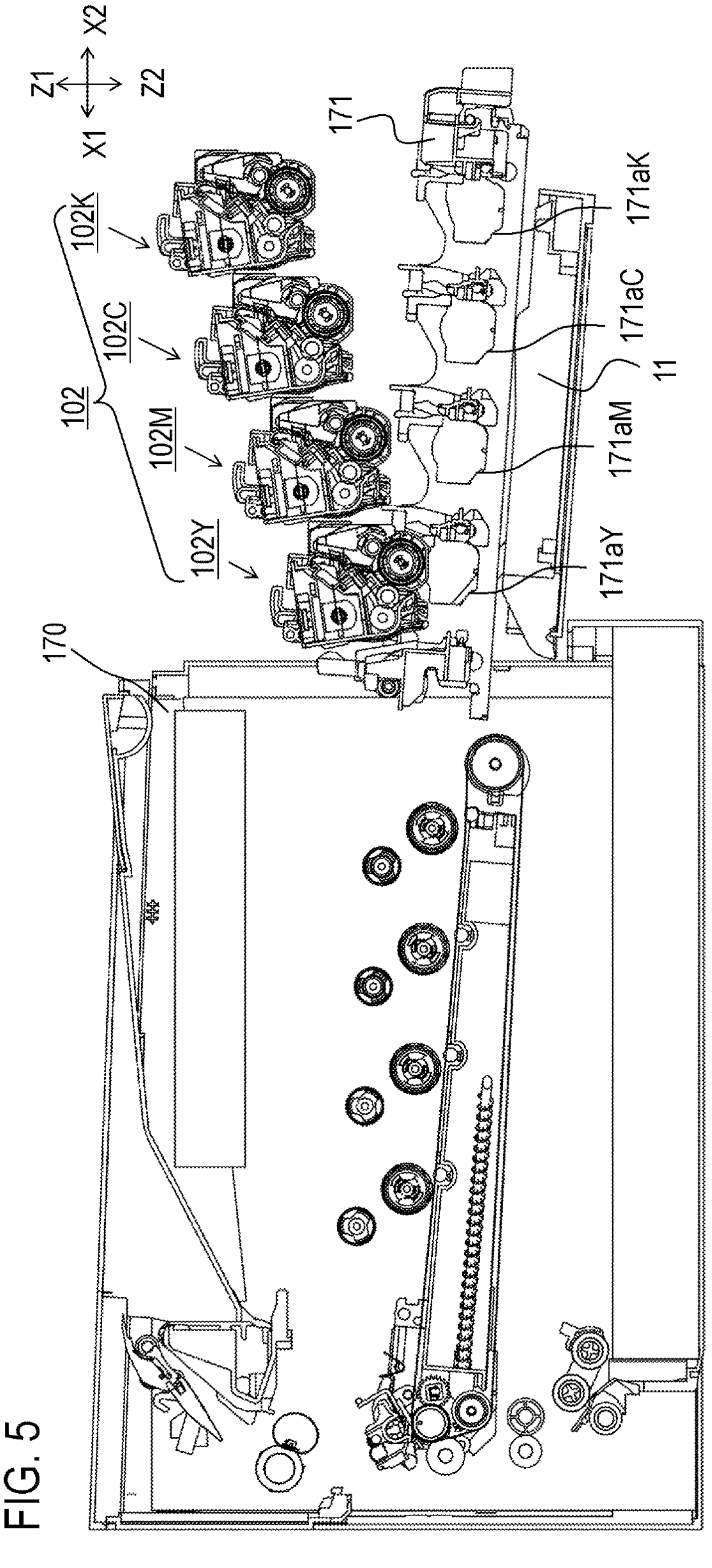
FIG. 5 is a schematic cross-sectional view of the image forming apparatus according to the first embodiment.

Next, a cartridge tray (hereinafter referred to as "tray") 171 that supports the cartridges 100 will be described in detail, with reference to FIGS. 3 to 5. FIG. 3 is a cross-sectional view of the image forming apparatus M in a state in which the tray 171 is drawn out to the outside of the apparatus main body 170, in a state in which the front door 11 is open. FIG. 4 is a cross-sectional view of the image forming apparatus M in a state in which the tray 171 is located outside of the apparatus main body 170 in a state in which the front door 11 is open, and toner cartridges 101 are removed from process cartridges 102. FIG. 5 is a cross-sectional view of the image forming apparatus M in a state in which the tray 171 is located outside of the apparatus main body 170 in a state in which the front door 11 is open, and the process cartridges 102 are removed from the tray 171.

As illustrated in FIGS. 3 to 5, the tray 171 is movable in the X1 direction (direction of pushing in) and the X2 direction (direction of drawing out) with respect to the apparatus main body 170, which are substantially level directions. That is to say, the tray 171 is provided so as to be capable of being drawn out and pushed in with respect to the apparatus main body 170, and the tray 171 is configured to be capable of moving in the substantially level directions in a state in which the apparatus main body 170 is installed on a level face. In other words, the tray 171 is configured so as to be movable between an outside position of being located outside of the apparatus main body 170 (position illustrated in FIGS. 3 to 5), and an inside position of being located inside of the apparatus main body 170 (position illustrated in FIG. 2). When located at the outside position, the tray 171 is located above the front door 11 that is in an open state.

The four cartridges 100 (100Y, 100M, 100C, 100K) are made up of the process cartridges 102 (102Y, 102M, 102C, 102K) and the toner cartridges 101 (101Y, 101M, 101C, 101K), respectively. As illustrated in FIG. 4, the toner cartridges 101 are configured to be removable from the process cartridges 102.

When the toner is gone from a toner cartridge 101, and printing cannot be performed, a user removes the toner cartridge 101. The user then attaches a new toner cartridge 101, by matching a toner-cartridge-side attaching portion 125 of the new toner cartridge 101 and a process-cartridge-side attaching portion 117 of the process cartridge 102. The user thereafter pushes the tray 171 into the apparatus main body 170 in the X1 direction and closes the front door 11, whereby the image forming apparatus M is in a state capable of executing image forming operations.

Also, the tray 171 has attaching portions 171*a* (171*a*Y, 171*a*M, 171*a*C, 171*a*K) from which the process cartridges 102 are removable at the outside position, as illustrated in FIG. 5. When the photosensitive drums, the developing rollers, or the like, of the image forming apparatus M deteriorate and printing quality can no longer be maintained, the user removes the process cartridges 102 from the attaching portions 171*a*, and attaches new process cartridges 102 to the attaching portions 171*a*. The user then attaches the toner cartridges 101, pushes the tray 171 into the apparatus main body 170 and closes the front door 11, whereby the image forming apparatus M is in a state capable of image formation.

Note that the process cartridges 102 may be integrally formed with the apparatus main body 170. In a case of a configuration in which the process cartridges 102 are non-removable from the apparatus main body 170 in this way, just the toner cartridges 101 are removable from the apparatus main body 170 (process cartridges 102), as illustrated in FIG. 4.

In the first embodiment, the intermediate transfer unit 12 is configured to be capable of moving up and down, by the front door 11 and a link mechanism that is omitted from illustration. Opening the front door 11 causes the intermediate transfer unit 12 to descend in the Z2 direction, and the photosensitive drum 104 and the transfer belt 12*a* are distanced from each other. Conversely, closing the front door 11 causes the intermediate transfer unit 12 to rise in the Z1 direction, and the photosensitive drum 104 and the transfer belt 12*a* come into contact with each other. Thus, the tray 171 can move the process cartridges 102 inside and outside of the apparatus main body 170, without the photosensitive drum 104 and the transfer belt 12*a* being in contact.

As described above, by using the tray 171, a plurality of the cartridges 100 can be moved inside and outside of the apparatus main body 170 together, thus enabling the toner cartridges 101 and the process cartridges 102 to be easily replaced.

Detailed Configuration of Cartridge

Figure 1:
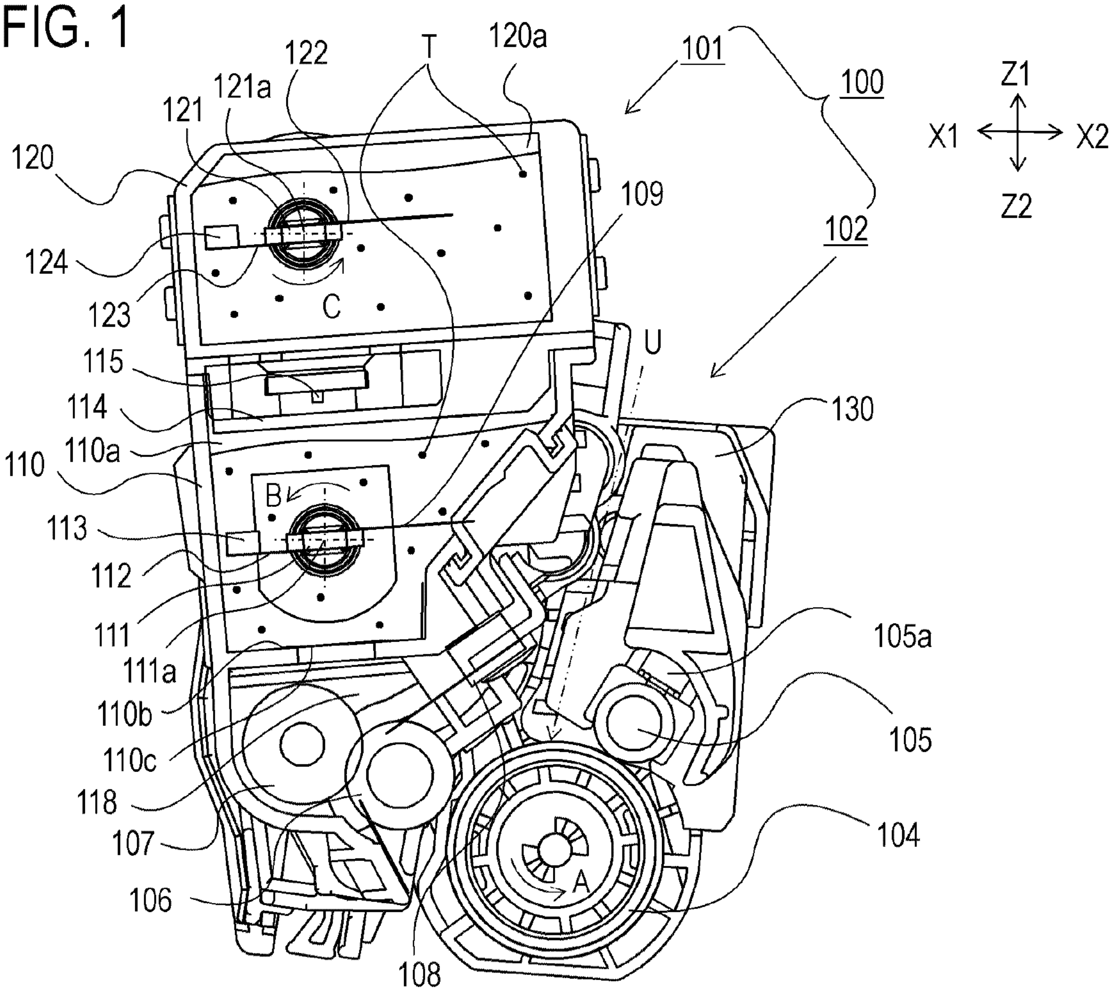
FIG. 1 is a cross-sectional view of a cartridge according to a first embodiment.
Figure 6:
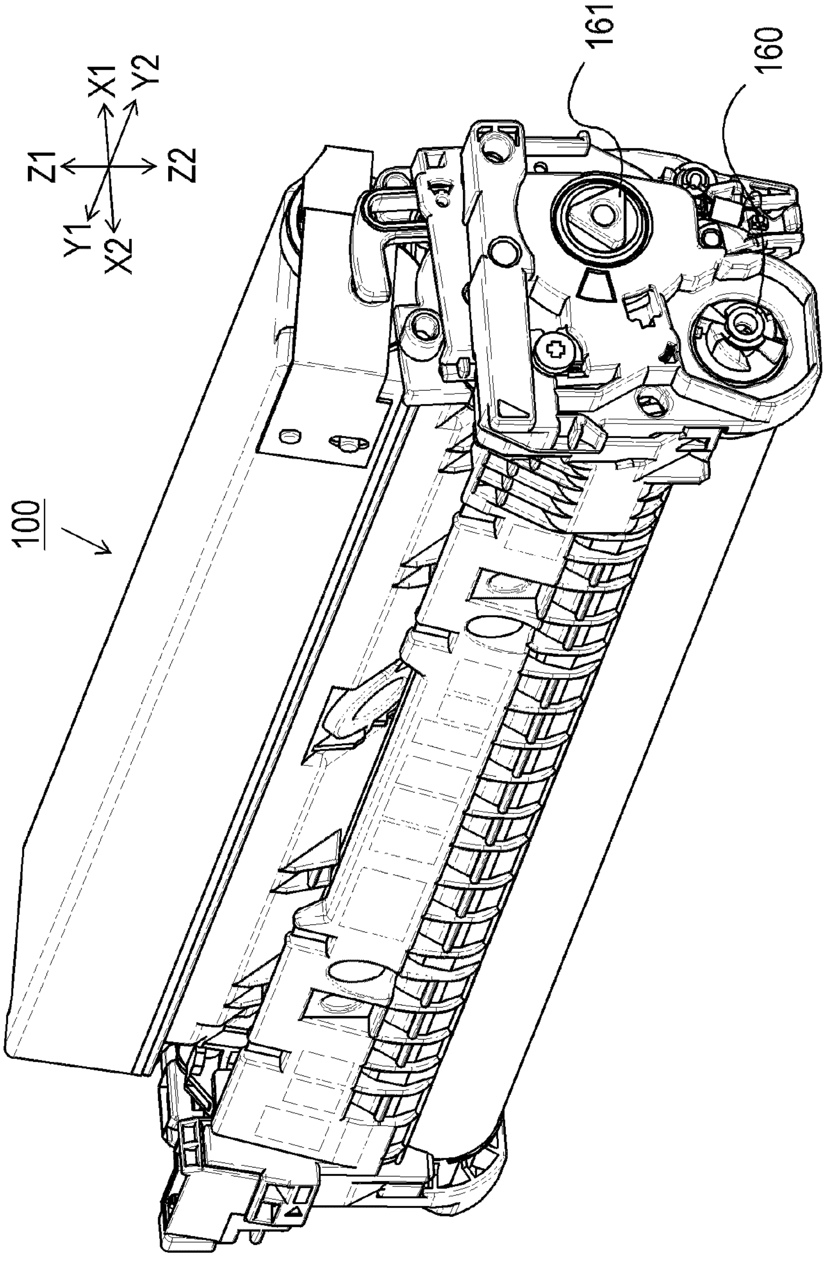
FIG. 6 is a perspective view of the cartridge according to the first embodiment.
Figure 7:
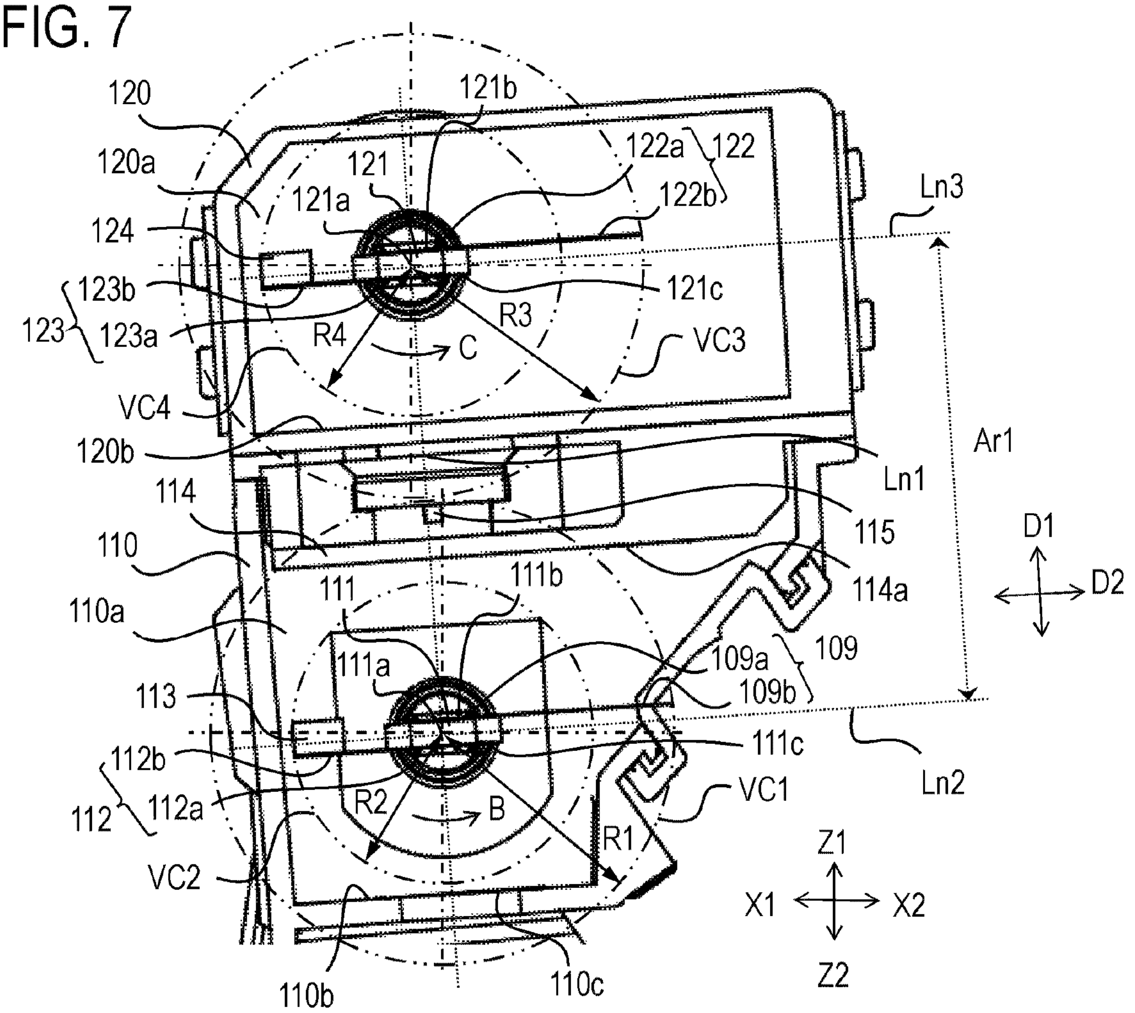
FIG. 7 is a schematic cross-sectional view of a developing container and a toner container according to the first embodiment.

Next, the configuration of the cartridge 100 will be described in detail with reference to FIGS. 1, 6, and 7. FIG. 1 is a cross-sectional view illustrating an inner configuration of the cartridge 100. FIG. 6 is a perspective view illustrating an external appearance of the cartridge 100. FIG. 7 is a schematic cross-sectional view of a developer container 110 and a toner container 120 that accommodate (hold) toner T, which are provided in the cartridge 100. In the first embodiment, the four cartridges 100 (100Y, 100M, 100C, 100K) have electrophotographic process mechanisms that are the same as each other, with colors of the toner T accommodated therein, and amounts of toner T filled therein, differing from each other. The configuration of the cartridge 100 in the following description is the same for all four cartridges 100 (100Y, 100M, 100C, 100K).

Inside of the cartridge 100 is filled with toner T that is the developer. In the cartridge 100, the toner T is accommodated in two accommodating portions, which are a first accommodating portion 110*a* and a second accommodating portion 120*a*. In FIG. 1 and other drawings, the toner T accommodated in the cartridge 100 is illustrated with black dots, and a wavy line indicating an upper face of the toner T with which the cartridge 100 is filled. The cartridge 100 is made up of the process cartridge 102 (first cartridge) and the toner cartridge 101 (second cartridge). The process cartridge 102 is configured to be detachably attachable to the image forming apparatus M, develops latent images on the photosensitive drum 104 in a stable manner with the toner T that is supplied thereto, which is transferred onto the intermediate transfer unit 12. The toner cartridge 101 is configured to be detachably attachable to the process cartridge 102, and supplies the toner T to the process cartridge 102.

The process cartridge 102 has the photosensitive drum 104 that is a photosensitive member that is rotatable, a container 130 that holds the photosensitive drum 104, and the charging roller 105 that is rotatable. The charging roller 105 is biased against the photosensitive drum 104 by a charging spring 105*a*, and is configured to be rotatable about the rotation axis line that is parallel to the width direction of the image forming apparatus M, in the same way as the photosensitive drum 104. A charge is input from the apparatus main body 170 to the charging roller 105 by a charging contact point that is omitted from illustration, whereby the surface of the photosensitive drum 104 is uniformly charged.

A drum coupling 160 for transmitting driving force to the photosensitive drum 104 is provided on one end of each photosensitive drum 104 in a longitudinal direction. Note that the photosensitive drum 104 is attached to the image forming apparatus M such that the longitudinal direction thereof is parallel to the width direction of the image forming apparatus M. The drum coupling 160 engages a drum drive coupling 180 (illustrated in FIG. 3) serving as a drum drive output portion of the apparatus main body 170. Driving force of a driving motor (omitted from illustration) of the apparatus main body 170 is transmitted to the photosensitive drum 104, whereby the photosensitive drum 104 is rotated in a direction of arrow A in FIG. 1 (clockwise direction).

Also, the process cartridge 102 is a developing apparatus that has the developer container 110 in which the first accommodating portion 110*a*, for accommodating the toner T that is developer supplied from the toner cartridge 101, is formed. A replenishing opening 110*c* for supplying the toner T from the developer container 110 toward a developing chamber 118 is formed in a lower face 110*b* that is located on a lower side out of inner faces of the developer container 110, in an orientation in which the cartridge 100 is attached to the apparatus main body 170. A supply roller 107 and the developing roller 106 serving as a developing member are provided inside of the developing chamber 118. The developing chamber 118 is located below the developer container 110 (first accommodating portion 110*a*), in an orientation in which the cartridge 100 is attached to the apparatus main body 170.

A lid 114 is attached to the developer container 110. The lid 114 is located on an upper side of the developer container 110 in an orientation in which the cartridge 100 is attached to the apparatus main body 170, and forms the first accommodating portion 110*a* along with the developer container 110. The lid 114 is located between the first accommodating portion 110*a* and the second accommodating portion 120*a* (details to be described later) of the toner container 120, and makes up a boundary portion that partitions between the first accommodating portion 110*a* and the second accommodating portion 120*a*. That is to say, a face 114*a* of the lid 114 that is a face that faces the first accommodating portion 110*a* is an upper face of the first accommodating portion 110*a*, and makes up an inner wall face of the first accommodating portion 110*a*. A channel (omitted from illustration) for supplying the toner T from the second accommodating portion 120*a* to the first accommodating portion 110*a* is formed in the lid 114.

A magnetism sensing sensor 115 that is capable of sensing magnetism is provided inside of the lid 114. The magnetism sensing sensor 115 is disposed at position that is different from the channel provided to the lid 114 through which the toner T passes, in a direction parallel to a first rotation axis line 111*a*.

A first rotation shaft 111 for stirring the toner T within the developer container is provided in the first accommodating portion 110*a*. The first rotation shaft 111 is configured to be rotatable about the first rotation axis line 111*a* that is parallel to the width direction (rotation axis line of the photosensitive drum 104) of the image forming apparatus M. A first stirring sheet 109 that supplies the toner T within the developer container 110 to the supply roller 107, and a first flexible sheet 112, are attached to the first rotation shaft 111. A first magnet 113 that is a first magnetized member is attached to a distal end portion of the first flexible sheet 112.

The first stirring sheet 109 is a sheet-like flexible member (third flexible member). The first stirring sheet 109 extends in a direction intersecting the first rotation axis line 111*a*, and has a fixed end 109*a* (third fixed end) that is fixed to the first rotation shaft 111, and a free end 109*b* (third free end). The first stirring sheet 109 extends over substantially the entire region of the first accommodating portion 110*a* in the direction parallel to the first rotation axis line 111*a*.

In a state in which the first stirring sheet 109 is not flexing, a distance from the first rotation axis line 111*a* (center of rotation) of the first rotation shaft 111 to the free end 109*b* of the first stirring sheet 109 is a length R1. FIG. 7 illustrates an imaginary circle VC1 of which the length R1 is the radius, by a dash-double-dot line. The imaginary circle VC1 corresponds to the path over which a distal end of the first stirring sheet 109 passes when the first rotation shaft 111 is rotated in a state in which the first stirring sheet 109 does not flex. The length R1 is set to be greater than a distance from the first rotation axis line 111*a* to the lower face 110*b* of the developer container 110 that makes up a replenishing opening 110*c*. According to such a configuration, the first stirring sheet 109 conveys the toner T while coming into contact with the lower face 110*b* of the developer container 110 in conjunction with rotation of the first rotation shaft 111. The toner T is thus fed out from the developer container 110 toward the supply roller 107 via the replenishing opening 110*c*.

As illustrated in FIG. 6, a developer coupling 161 is provided on one end of the cartridge 100 in the longitudinal direction. When the process cartridge 102 is attached to the apparatus main body 170, the developer coupling 161 and a developer driving coupling 185 that is provided to the apparatus main body 170 (illustrated in FIG. 3) are engaged. Engagement of the developer coupling 161 and the developer driving coupling 185 transmits driving force of a driving motor (omitted from illustration) of the apparatus main body 170 to the first rotation shaft 111. The first rotation shaft 111 to which driving force is transmitted is rotated in a direction of arrow B in FIG. 1 and other drawings (counterclockwise direction).

The toner T supplied to the supply roller 107 is supplied to the developing roller 106. A developing blade 108 then regulates the toner T on the developing roller 106 to a uniform thickness. Thus, toner can be stably supplied to the photosensitive drum 104 with which the developing roller 106 is in contact.

The first flexible sheet 112 is a sheet-like flexible member (first flexible member). The first flexible sheet 112 extends in a direction intersecting the first rotation axis line 111*a*, and has a first fixed end 112*a* that is fixed to the first rotation shaft 111, and a first free end 112*b*. In a direction parallel to the first rotation axis line 111*a*, the width of the first flexible sheet 112 is smaller than the width of the first stirring sheet 109. The longitudinal direction of the first flexible sheet 112 is a direction extending from the first fixed end 112*a* to the first free end 112*b*.

In a state in which the first flexible sheet 112 is not flexing, a distance from the first rotation axis line 111*a* (center of rotation) of the first rotation shaft 111 to the first free end 112*b* of the first flexible sheet 112 is a length R2. FIG. 7 illustrates an imaginary circle VC2 of which the length R2 is the radius, by a dash-double-dot line. The imaginary circle VC2 corresponds to the path over which the distal end of the first flexible sheet 112 passes when the first rotation shaft 111 is rotated in a state in which the first flexible sheet 112 does not flex. The length R2 is set to be smaller than a distance from the first rotation axis line 111*a* to the face 114*a* of the lid 114 (upper face of first accommodating portion 110*a*). Accordingly, when the first rotation shaft 111 is rotating, the first flexible sheet 112 does not come into contact with the lid 114 that is the boundary portion of the first accommodating portion 110*a* and the second accommodating portion 120*a*.

The first rotation shaft 111 has a first face 111*b* to which the fixed end 109*a* (third fixed end) of the first stirring sheet 109 is fixed, and a second face 111*c* to which the first fixed end 112*a* of the first flexible sheet 112 is fixed. In the first embodiment, the first face 111*b* and the second face 111*c* face opposite directions from each other. Also, a direction in which the first stirring sheet 109 protrudes from the first rotation shaft 111 and a direction in which the first flexible sheet 112 protrudes from the first rotation shaft 111 are opposite directions from each other.

The first magnet 113 is provided in a region between the first fixed end 112*a* and first free end 112*b* of the first flexible sheet 112. More specifically, the first magnet 113 is provided at a position that is closer to the first free end 112*b* than the first fixed end 112*a* of the first flexible sheet 112. The first magnet 113 is provided on a face of the first flexible sheet 112 that is fixed to the first rotation shaft 111 and that faces a downstream side in a direction of rotation when the first rotation shaft 111 rotates in the direction of the arrow B. The first magnet 113 is disposed so as not to come into contact with the lid 114, the same as with the first flexible sheet 112 when the first rotation shaft 111 rotates.

The toner cartridge 101 has the toner container 120 in which is formed the second accommodating portion 120*a* for accommodating toner T to be supplied to the process cartridge 102. A supply opening (omitted from illustration) for supplying toner T from the toner container 120 toward the developer container 110 is formed in a lower face 120*b* that makes up an inner wall face of the second accommodating portion 120*a*, in an orientation in which the cartridge 100 is attached to the apparatus main body 170. Also, in a state in which the toner cartridge 101 is attached to the process cartridge 102, the second accommodating portion 120*a* is aligned with the first accommodating portion 110*a* in a first direction D1. In the first embodiment, the first direction D1 is a direction that is orthogonal to the Y1 (Y2) direction, and that intersects the Z1 (Z2) direction and the X1 (X2) direction. An angle formed between the first direction D1 and the Z1 direction is smaller than an angle formed between the first direction D1 and the X1 direction.

A second rotation shaft 121 for stirring the toner T within the toner container 120 is provided in the toner container 120. The second rotation shaft 121 is configured to be rotatable about a second rotation axis line 121*a* that is parallel to the width direction of the image forming apparatus M. A second stirring sheet 122 that supplies the toner T within the toner container 120 to the developer container 110, and a second flexible sheet 123 are attached to the second rotation shaft 121. A second magnet 124 that is a second magnetized member is attached to a distal end portion of the second flexible sheet 123.

The second stirring sheet 122 is a sheet-like flexible member (fourth flexible member). The second stirring sheet 122 extends in a direction intersecting the second rotation axis line 121*a*, and has a fixed end 122*a* (fourth fixed end) that is fixed to the second rotation shaft 121, and a free end 122*b* (fourth free end). The second stirring sheet 122 extends over substantially the entire region of the second accommodating portion 120*a* in a direction parallel to the second rotation axis line 121*a*.

In a state in which the second stirring sheet 122 is not flexing, a distance from the second rotation axis line 121*a* (center of rotation) of the second rotation shaft 121 to the free end 122*b* of the second stirring sheet 122 is a length R3. FIG. 7 illustrates an imaginary circle VC3 of which the length R3 is the radius, by a dash-double-dot line. The imaginary circle VC3 corresponds to the path over which a distal end of the second stirring sheet 122 passes when the second rotation shaft 121 is rotated in a state in which the second stirring sheet 122 does not flex. The length R3 is set to be greater than a distance from the second rotation axis line 121*a* to the lower face 120*b* of the toner container 120 in which the supply opening is formed, and to the supply opening formed in the lower face 120*b*. Accordingly, the second stirring sheet 122 conveys the toner T while coming into contact with the lower face 120*b* of the toner container 120 in conjunction with rotation of the second rotation shaft 121. The toner T is thus fed out from the toner container 120 toward the developer container 110 via the supply opening.

The cartridge 100 has a driving transmission mechanism that transmits drive force from the process cartridge 102 to the second rotation shaft 121 of the toner cartridge 101. Upon driving force being transmitted from the process cartridge 102 to the second rotation shaft 121, the second rotation shaft 121 rotates in a direction of arrow C illustrated in FIG. 1 and other drawings. The second stirring sheet 122 then conveys the toner T, and the toner T is supplied to the process cartridge 102 via the supply opening.

The second flexible sheet 123 is a sheet-like flexible member (second flexible member). The second flexible sheet 123 extends in a direction intersecting the second rotation axis line 121*a*, and has a second fixed end 123*a* that is fixed to the second rotation shaft 121, and a second free end 123*b*. In a direction parallel to the second rotation axis line 121*a*, the width of the second flexible sheet 123 is smaller than the width of the second stirring sheet 122. The longitudinal direction of the second flexible sheet 123 is a direction extending from the second fixed end 123*a* to the second free end 123*b*.

In a state in which the second flexible sheet 123 is not flexing, a distance from the second rotation axis line 121*a* (center of rotation) of the second rotation shaft 121 to the second free end 123*b* of the second flexible sheet 123 is a length R4. FIG. 7 illustrates an imaginary circle VC4 of which the length R4 is the radius, by a dash-double-dot line. The imaginary circle VC4 corresponds to the path over which the distal end of the second flexible sheet 123 passes when the second rotation shaft 121 is rotated in a state in which the second flexible sheet 123 does not flex. The length R4 is set to be smaller than a distance from the second rotation axis line 121*a* to the lower face 120*b* of the toner container 120 in which the supply opening is formed, and to the supply opening formed in the lower face 120*b*. Accordingly, when the second rotation shaft 121 is rotating, the second flexible sheet 123 does not come into contact with the lower face 120*b*.

The second rotation shaft 121 has a third face 121*b* to which the fixed end 122*a* (fourth fixed end) of the second stirring sheet 122 is fixed, and a fourth face 121*c* to which the second fixed end 123*a* of the second flexible sheet 123 is fixed. In the first embodiment, the third face 121*b* and the fourth face 121*c* face opposite directions from each other. Also, a direction in which the second stirring sheet 122 protrudes from the second rotation shaft 121 and a direction in which the second flexible sheet 123 protrudes from the second rotation shaft 121 are opposite directions from each other.

The second magnet 124 is provided in a region between the second fixed end 123*a* and the second free end 123*b* of the second flexible sheet 123. More specifically, the second magnet 124 is provided at a position that is closer to the second free end 123*b* than the second fixed end 123*a* of the second flexible sheet 123. The second magnet 124 is provided on a face of the second flexible sheet 123 that is fixed to the second rotation shaft 121 and that is a face that faces the downstream side in the direction of rotation when the second rotation shaft 121 rotates in the direction of the arrow C. The second magnet 124 is disposed so as not to come into contact with the lower face 120*b* when the second rotation shaft 121 rotates, the same as with the second flexible sheet 123.

Note that while the cartridge is configured as an integral all-in-one cartridge in the first embodiment, application of the present invention is not limited to such a configuration. For example, a configuration may be made in which the toner cartridge that holds the toner and the process cartridge that has the developing roller, the supply roller, the drum, the charging roller, and the cleaning member, may each be independently detachably attachable to the apparatus main body. Alternatively, a form may be made in which the cartridge is made up of a developing unit that has the developing roller, the supply roller, and the toner, and a drum unit that holds the photosensitive drum, the charging roller, and the cleaning member. Also, a configuration may be made in which a configuration that is equivalent to the process cartridge 102 is not removable from the apparatus main body, and only a cartridge that is equivalent to the toner cartridge 101 is detachably attachable. Further, an image forming apparatus may be configured such that configurations that are equivalent to the process cartridge 102 and the toner cartridge 101 are not removable from the apparatus main body.

Remaining Toner Amount Sensing Method

Next, a sensing method of remaining toner amount by the image forming apparatus M will be described with reference to FIGS. 8A to 8C, FIGS. 9A to 9C, FIGS. 10A to 10C, and FIGS. 11 and 12. Upon printing operations being executed in the image forming apparatus M, toner is consumed, and the amount of toner within the cartridge 100 decreases. If printing operations happen to be executed in a state in which there is scant toner within the cartridge 100, sufficient toner may not be printed on printed articles, resulting in defective printing. Accordingly, it is desirable for the image forming apparatus M to be configured such that a situation in which there is a scant amount of toner within the cartridge 100 can be comprehended, and the user can be provided with a report thereof before the toner runs out. Thus, the image forming apparatus M is configured to be capable of sensing the amount of toner in the cartridge 100.

As described above, the first flexible sheet 112 is attached to the first rotation shaft 111 of the process cartridge 102, and the first magnet 113 serving as the first magnetized member is attached to the distal end of the first flexible sheet 112. Also, the second flexible sheet 123 is attached to the second rotation shaft 121 of the toner cartridge 101, and the second magnet 124 serving as the second magnetized member is attached to the distal end of the second flexible sheet 123. Note that while a magnet is used as the magnetized member in the first embodiment, this can be substituted with another member that is magnetized (emits magnetism).

Also, as described above, the magnetism sensing sensor 115 that senses magnetism within a sensing-capable range is attached to the lid 114 of the process cartridge 102. The magnetism sensing sensor 115 is provided between the first rotation axis line 111*a* and the second rotation axis line 121*a* in the first direction D1. That is to say, the magnetism sensing sensor 115 is located in a region Ar1 (see FIG. 7) between an imaginary line Ln2 that passes through the first rotation axis line 111*a* and an imaginary line Ln3 that passes through the second rotation axis line 121*a*, which are perpendicular to an imaginary line Ln1 that passes through the first rotation axis line 111*a* and the second rotation axis line 121*a*. Note that the imaginary line Ln2 and the imaginary line Ln3 are imaginary lines that extend in the second direction D2 that is perpendicular to the first direction D1 and the Y1 (Y2) direction. In the first embodiment, the magnetism sensing sensor 115 is disposed between the first accommodating portion 110*a* formed in the developer container 110 of the process cartridge 102 and the second accommodating portion 120*a* formed in the toner container 120 of the toner cartridge 101.

As described above, the first magnet 113 and the second magnet 124 are each provided on a flexible sheet of which an end portion is fixed to the rotation shaft. Accordingly, a distance between the first magnet 113 and the magnetism sensing sensor 115 changes in conjunction with rotation of the first rotation shaft 111, and a distance between the second magnet 124 and the magnetism sensing sensor 115 changes in conjunction with rotation of the second rotation shaft 121. According to such a configuration, the first magnet 113 and the second magnet 124 are disposed so as to be capable of entering and exiting a sensing-capable range of the magnetism sensing sensor 115. When the first magnet 113 and the second magnet 124 enter the sensing-capable range of the magnetism sensing sensor 115, in conjunction with rotation of the first rotation shaft 111 and the second rotation shaft 121, the magnetism sensing sensor 115 senses magnetism. In the first embodiment, the remaining toner amount is acquired on the basis of results of sensing by the magnetism sensing sensor 115. The magnetism sensing sensor 115 can be disposed on the imaginary line Ln1 that passes through the first rotation axis line 111*a* and the second rotation axis line 121*a*, for example.

The magnetism sensing sensor 115 performs detection while distinguishing between magnetism of the first magnet 113 and of the second magnet 124, and accordingly the phases of the first rotation shaft 111 and the second rotation shaft 121 are controlled such that the first magnet 113 and the second magnet 124 do not enter the sensing-capable range of the magnetism sensing sensor 115 at the same time. A method of controlling the phases of the first rotation shaft 111 and the second rotation shaft 121 by a control portion in the first embodiment will be described below.

Figure 8C:
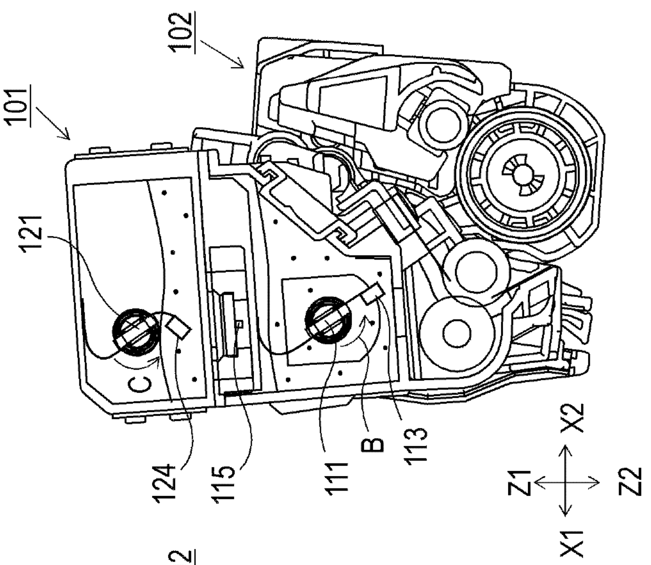
FIGS. 8A to 8C are explanatory diagrams regarding phase matching according to the first embodiment.
Figure 8B:
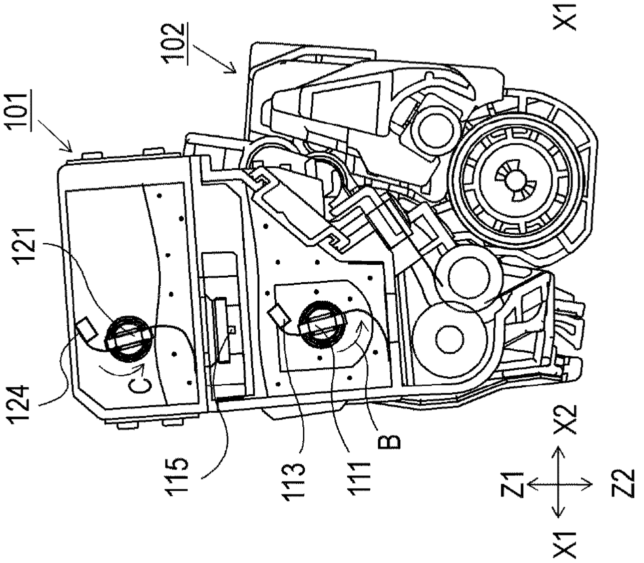
Figure 8A:
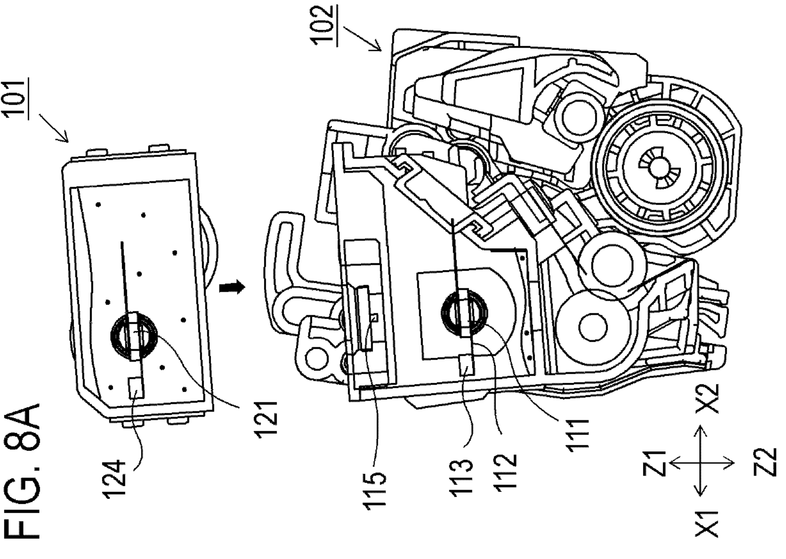

FIGS. 8A to 8C are explanatory diagrams illustrating a relation of phases of the first rotation shaft 111 and the second rotation shaft 121, and are schematic cross-sectional view of the cartridge 100. FIG. 8A illustrates the way in which a new toner cartridge 101 is attached to the process cartridge 102. When replacing the toner cartridge 101, the phase of the first rotation shaft 111 provided in the process cartridge 102 is controlled by the magnetism sensing sensor 115 so as to be constantly unchanged. In the first embodiment, the phase of the first rotation shaft 111 is controlled such that the first face 111*b* to which the first stirring sheet 109 is fixed faces upward, and the first flexible sheet 112 faces downward, in an orientation in which the cartridge 100 is attached to the apparatus main body 170.

Also, in the toner cartridge 101 that is to be newly attached, the phase of the second rotation shaft 121 is set so as to avert a situation in which the first magnet 113 and the second magnet 124 are located in the sensing-capable range of the magnetism sensing sensor 115 at the same time.

Specifically, the phase of the second rotation shaft 121 is controlled such that the third face 121*b* to which the second stirring sheet 122 is fixed faces upwards and the fourth face 121*c* to which the second flexible sheet 123 is fixed faces downwards, in an orientation in which the cartridge 100 is attached to the apparatus main body 170. That is to say, when the toner cartridge 101 is attached to the process cartridge 102, the phase of the first rotation shaft 111 and the phase of the second rotation shaft 121 are the same.

Further, the same gear is used as a gear for rotationally driving the first rotation shaft 111 and a gear for rotationally driving the second rotation shaft 121, and the revolutions of the first rotation shaft 111 and the second rotation shaft 121 are constantly the same. That is to say, the phases of the first rotation shaft 111 and the second rotation shaft 121 are controlled such that the second face 111*c* (first plane) of the first rotation shaft 111 and the fourth face 121*c* (second plane) of the second rotation shaft 121 are parallel to each other, and also face the same direction. According to such a configuration, when the first rotation shaft 111 rotates and the first magnet 113 nears the magnetism sensing sensor 115, for example, the second magnet 124 is at a position distanced from the magnetism sensing sensor 115 as compared to the first magnet 113. FIG. 8B illustrates the way in which the first magnet 113 nears the magnetism sensing sensor 115, and the second magnet 124 is being distanced from the magnetism sensing sensor 115. Further continuing rotation of the first rotation shaft 111 and the second rotation shaft 121 from the state in FIG. 8B distances the first magnet 113 from the magnetism sensing sensor 115, and the second magnet 124 nears the magnetism sensing sensor 115. FIG. 8C illustrates the way in which the first magnet 113 is distanced from the magnetism sensing sensor 115, and the second magnet 124 nears the magnetism sensing sensor 115. In this way, according to the first embodiment, the phases of the first rotation shaft 111 and the second rotation shaft 121 are controlled such that the timings at which the first magnet 113 and the second magnet 124 near the magnetism sensing sensor 115 are made to be different from each other. That is to say, when the first magnet 113 is located in the sensing-capable range of the magnetism sensing sensor 115, the second magnet 124 is located outside of this sensing-capable range, and when the second magnet 124 is located in the sensing-capable range of the magnetism sensing sensor 115, the first magnet 113 is located outside of this sensing-capable range. Thus, according to such a configuration, a situation in which the first magnet 113 and the second magnet 124 are both located in the sensing-capable range of the magnetism sensing sensor 115 at the same time can be averted, and magnetism of both the first magnet 113 and of the second magnet 124 can be detected by the single magnetism sensing sensor 115.

Whether magnetism sensed by the magnetism sensing sensor 115 is from the first magnet 113 or from the second magnet 124 may be distinguished by managing a relation between the phases of the first rotation shaft 111 and the second rotation shaft 121, and point in time, for example. The magnet that is at a position near to the magnetism sensing sensor 115 can be found from the point in time at which the magnetism sensing sensor 115 senses magnetism, and the phases of the first rotation shaft 111 and the second rotation shaft 121. Alternatively, the initial phases of the first rotation shaft 111 and the second rotation shaft 121 when a new toner cartridge 101 is attached may be set as described above, and distinguishing may be performed in which the magnetism that is sensed first is that of the first magnet 113, and the magnetism that is sensed second is that of the second magnet 124.

Next, an acquisition method of the amount of toner will be described. The acquisition method of the amount of toner in the cartridge 100 is the same for all four cartridges 100 (100Y, 100M, 100C, 100K).

Figure 9A:
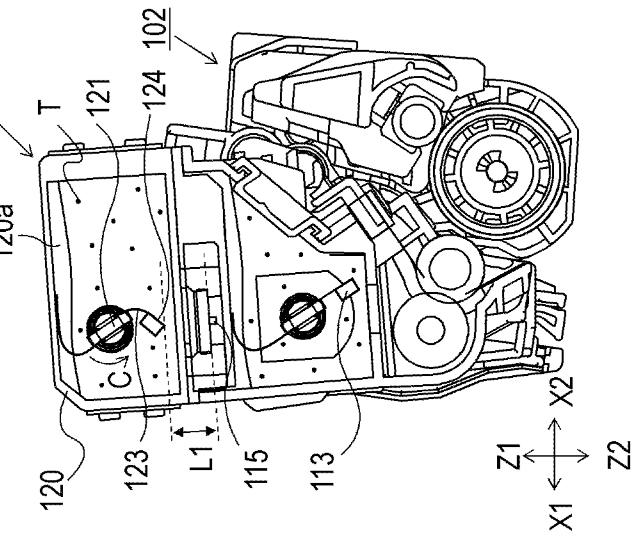
FIGS. 9A to 9C are explanatory diagrams regarding a remaining toner amount sensing method according to the first embodiment.
Figure 9B:
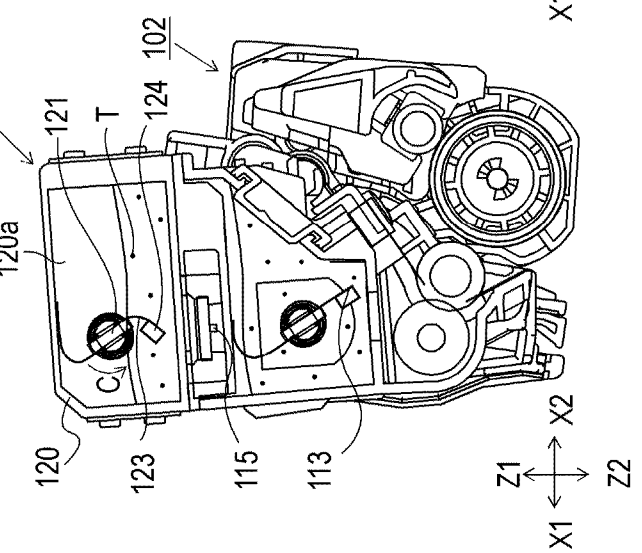
Figure 9C:
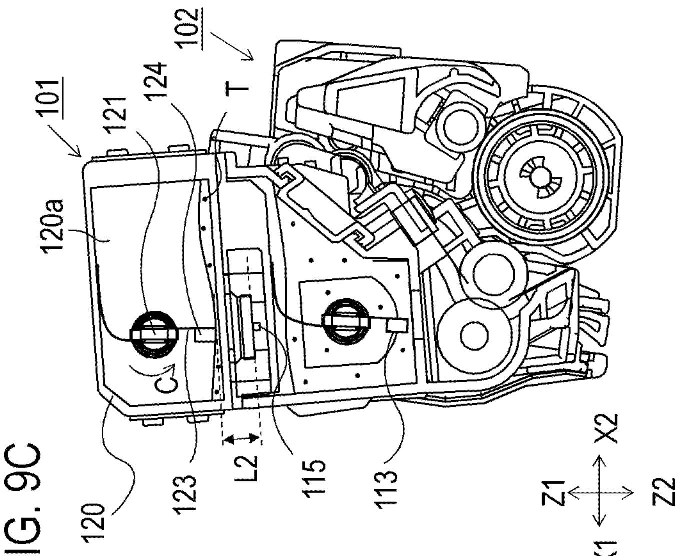
Figure 11:
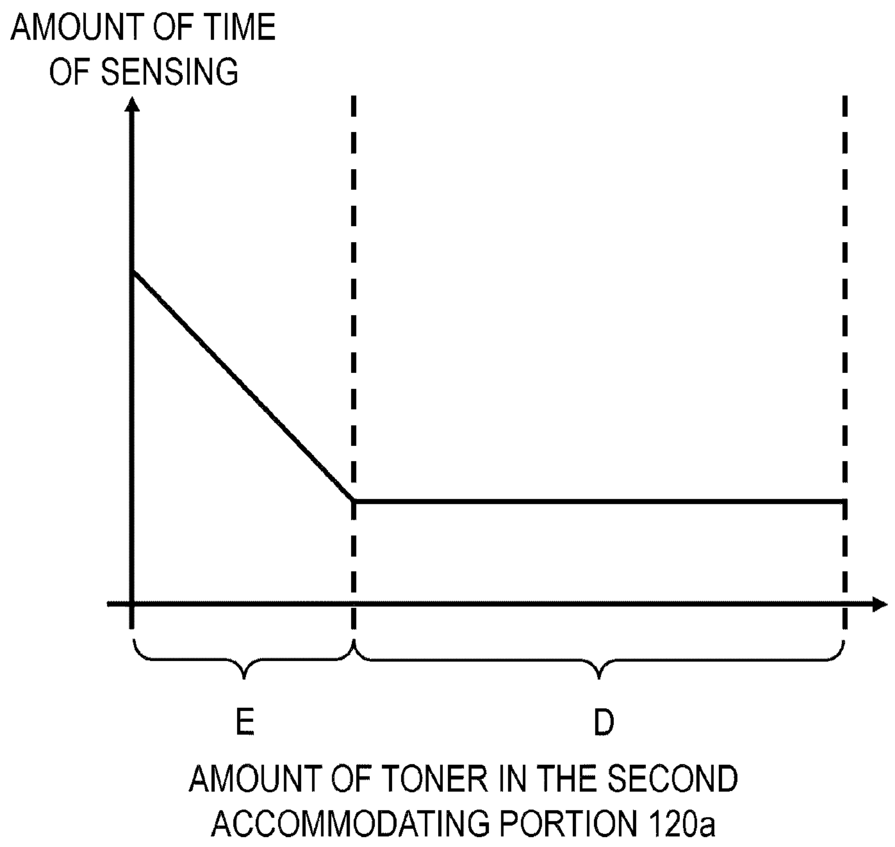
FIG. 11 is an explanatory diagram of a relation between amount of time of sensing and remaining toner amount, according to the first embodiment.

First, the acquisition method of amount of toner in the toner cartridge 101 will be described. FIGS. 9A to 9C are explanatory diagrams regarding the acquisition method of the amount of toner in the second accommodating portion 120*a* of the toner cartridge 101, and illustrate the cartridge 100 in an orientation of being attached to the apparatus main body 170. FIG. 11 is a graph illustrating a relation between the amount of toner in the second accommodating portion 120*a* of the toner cartridge 101, and amount of time of sensing by the magnetism sensing sensor 115.

FIG. 9A illustrates a situation in which the toner T accommodated in the second accommodating portion 120*a* of the toner container 120 is plentiful (the amount of toner is great), and the highest face of the toner T is upward from the second rotation shaft 121. The second flexible sheet 123 can be made of a polyethylene terephthalate (PET) or polyphenylene sulfide (PPS) sheet that is 50 μm thick, for example. In a state in which the toner T in the second accommodating portion 120*a* is plentiful, when the second rotation shaft 121 rotates in the direction of the arrow C, the second flexible sheet 123 rotates while flexing under resistance from the toner T. The shortest distance between the second magnet 124 and the magnetism sensing sensor 115 when the second magnet 124 is nearest to the magnetism sensing sensor 115 in such a state is distance L1.

FIG. 9B illustrates a situation in which the amount of toner accommodated in the second accommodating portion 120*a* of the toner container 120 is less than that in the case of FIG. 9A. When the amount of toner in the second accommodating portion 120*a* decreases and the resistance of the toner T that the second flexible sheet 123 is subjected to is reduced, the amount of flexing of the second flexible sheet 123 decreases. Then, when the amount of flexing of the second flexible sheet 123 when the second flexible sheet 123 passes beneath the second rotation shaft 121 decreases, the shortest distance between the second magnet 124 and the magnetism sensing sensor 115 becomes smaller.

FIG. 9C illustrates a situation in which the amount of toner accommodated in the second accommodating portion 120*a* of the toner container 120 is less than that in the case of FIG. 9B. In such a case, the resistance of the toner T that the second flexible sheet 123 is subjected to is reduced even further, the amount of flexing of the second flexible sheet 123 decreases even further. Accordingly, the shortest distance between the second magnet 124 and the magnetism sensing sensor 115 when the second magnet 124 is nearest to the magnetism sensing sensor 115 becomes a distance L2 that is smaller than the distance L1 (L1>L2).

As described above, the shortest distance between the second magnet 124 and the magnetism sensing sensor 115 gradually becomes smaller from a certain point in conjunction with the reduction in the amount of toner in the second accommodating portion 120*a*. The shortest distance becoming smaller means that the amount of time that the second magnet 124 is in the sensing-capable range of the magnetism sensing sensor 115 becomes longer in each rotation of the second rotation shaft 121, for example. FIG. 11 shows the relation between the amount of time of sensing by the magnetism sensing sensor 115 and the amount of toner in the second accommodating portion 120*a*.

As shown in FIG. 11, when the amount of toner is no less than a predetermined amount (portion D in FIG. 11), the amount of time of sensing by the magnetism sensing sensor 115 is constant. At this time, in a case in which the amount of flexing of the second flexible sheet 123 is great, and the second magnet 124 does not enter into the sensing-capable range of the magnetism sensing sensor 115, the amount of time of sensing by the magnetism sensing sensor 115 will be constant at zero. The reason is that in a case in which a great amount of toner T is accommodated in the second accommodating portion 120*a* as illustrated in FIG. 9A, even if the amount of toner decreases somewhat, the amount of flexing of the second flexible sheet 123 when the second magnet 124 nears the magnetism sensing sensor 115 hardly changes at all.

Conversely, when the amount of toner is no more than the predetermined amount (portion E in FIG. 11), the amount of time of sensing by the magnetism sensing sensor 115 becomes longer in conjunction with the amount of toner decreasing. The reason is that in a case in which the amount of toner in the second accommodating portion 120*a* is small, as illustrated in FIG. 9C, the amount of flexing of the second flexible sheet 123 is reduced, and the second magnet 124 comes nearer to the magnetism sensing sensor 115. At this time, the amount of toner in the second accommodating portion 120*a* and the amount of time of sensing by the magnetism sensing sensor 115 are proportionate. Accordingly, the image forming apparatus M can acquire (estimate) the amount of toner in the second accommodating portion 120*a* on the basis of the amount of time of sensing by the magnetism sensing sensor 115, by a toner amount acquisition portion. For the toner amount acquisition portion, a control portion made up of a central processing unit (CPU) or the like, for example, may be used. The toner amount acquisition portion can be provided at any position, such as the apparatus main body 170 of the image forming apparatus M, the cartridge 100, or the like, for example.

According to the cartridge 100 configured as described above, the image forming apparatus M can acquire the amount of toner in the second accommodating portion 120*a* on the basis of the results of sensing by the magnetism sensing sensor 115. The user can then be notified, by notification means such as a monitor or the like that the image forming apparatus M is equipped with, that the amount of toner remaining in the toner cartridge 101 is either scant or is zero, and thereby prompt replacement of the toner cartridge 101. Note that as illustrated in FIGS. 9A to 9C, when the second magnet 124 is located in the sensing-capable range of the magnetism sensing sensor 115, the first magnet 113 is distanced from the magnetism sensing sensor 115, and is located at a position away from this sensing-capable range.

Figure 10A:
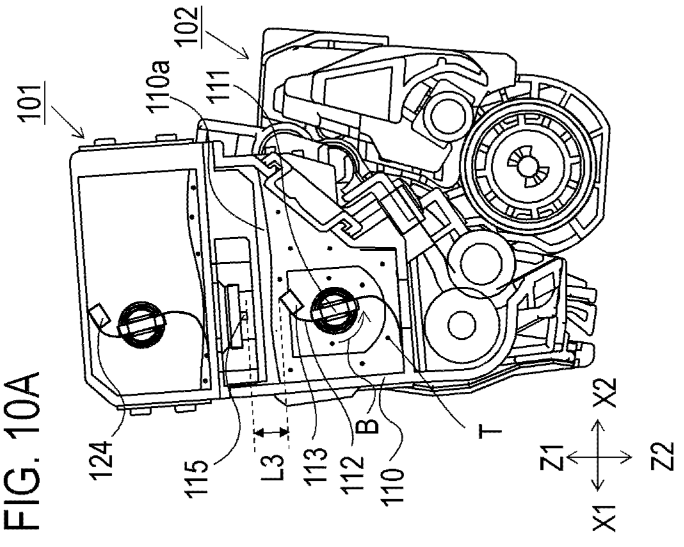
FIGS. 10A to 10C are explanatory diagrams regarding the remaining toner amount sensing method according to the first embodiment.
Figure 10B:
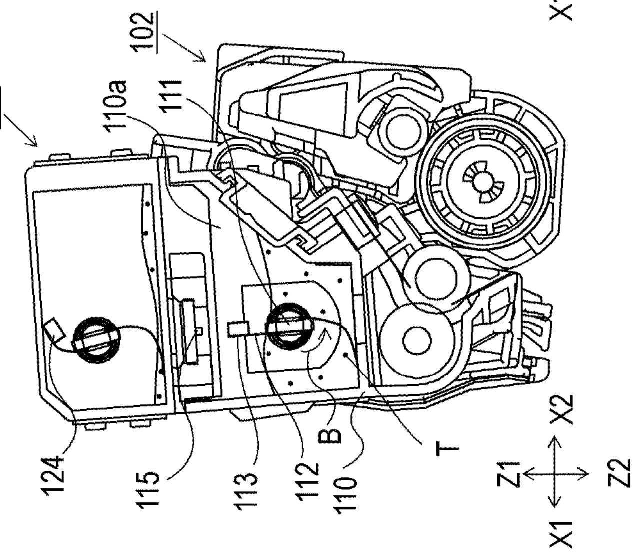
Figure 10C:
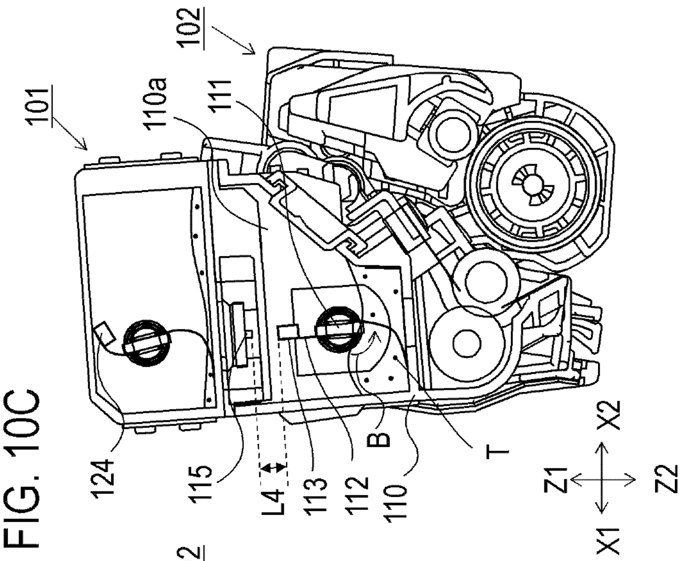
Figure 12:
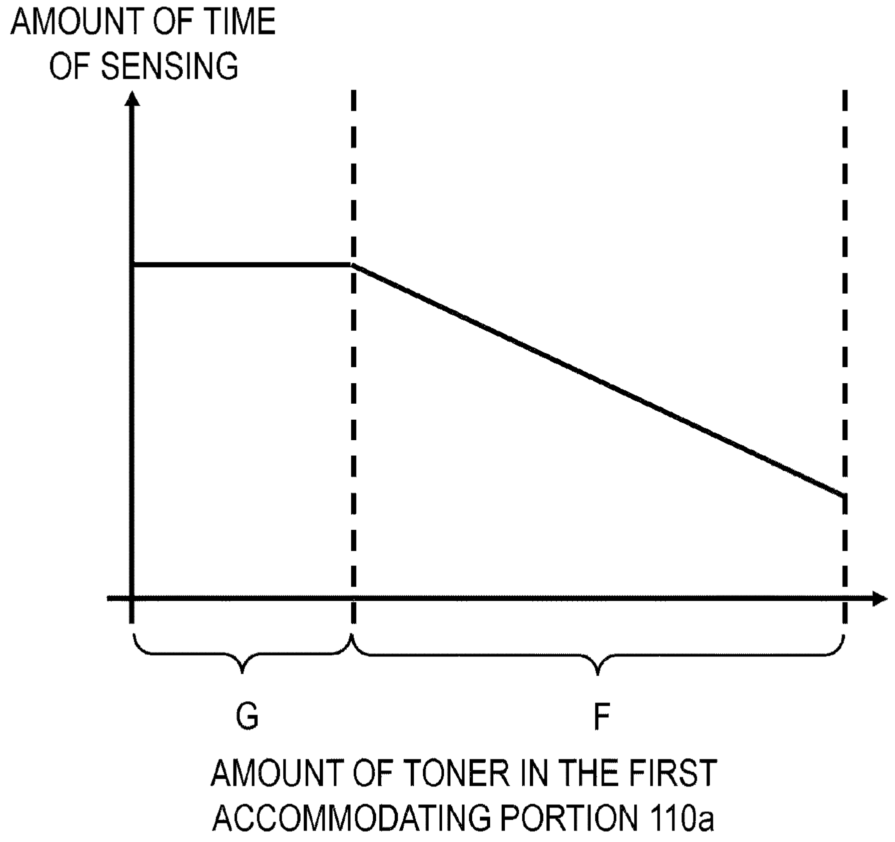
FIG. 12 is an explanatory diagram of a relation between amount of time of sensing and remaining toner amount, according to the first embodiment.

Next, the acquisition method of the amount of toner in the process cartridge 102 will be described. FIGS. 10A to 10C are explanatory diagrams regarding the acquisition method of the amount of toner in the first accommodating portion 110*a* of the process cartridge 102, and illustrate the cartridge 100 in an orientation of being attached to the apparatus main body 170. FIG. 12 is a graph showing a relation between the amount of toner in the first accommodating portion 110*a* of the process cartridge 102, and amount of time of sensing by the magnetism sensing sensor 115.

FIG. 10A illustrates a situation in which the toner T accommodated in the first accommodating portion 110*a* of the developer container 110 is plentiful (the amount of toner is great), and the highest face of the toner T is located above the first rotation shaft 111. The first flexible sheet 112 can be made of a PET or PPS sheet that is 50 μm thick, for example. In a state in which the toner T in the first accommodating portion 110*a* is plentiful, when the first rotation shaft 111 rotates in the direction of the arrow B, the first flexible sheet 112 rotates while flexing under resistance from the toner T. The shortest distance between the first magnet 113 and the magnetism sensing sensor 115 when the first magnet 113 is nearest to the magnetism sensing sensor 115 in such a state is distance L3.

FIG. 10B illustrates a situation in which the amount of toner accommodated in the first accommodating portion 110*a* of the developer container 110 is less than that in the case of FIG. 10A. When the amount of toner in the first accommodating portion 110*a* decreases and the resistance of the toner T that the first flexible sheet 112 is subjected to is reduced, the amount of flexing of the first flexible sheet 112 decreases. When the amount of flexing of the first flexible sheet 112 when the first flexible sheet 112 passes beneath the first rotation shaft 111 decreases, the shortest distance between the first magnet 113 and the magnetism sensing sensor 115 becomes smaller.

FIG. 10C illustrates a situation in which the amount of toner accommodated in the first accommodating portion 110*a* of the developer container 110 is less than that in the case of FIG. 10B. In such a case, the resistance of the toner T that the first flexible sheet 112 is subjected to is reduced even further, the amount of flexing of the first flexible sheet 112 decreases even further. Accordingly, the shortest distance between the first magnet 113 and the magnetism sensing sensor 115 when the first magnet 113 is nearest to the magnetism sensing sensor 115 becomes a distance LA that is smaller than the distance L3 (L3>L4).

As described above, the shortest distance between the first magnet 113 and the magnetism sensing sensor 115 gradually becomes smaller, in conjunction with the decrease in the amount of toner in the first accommodating portion 110*a*. The shortest distance becoming smaller means that the amount of time that the first magnet 113 is located in the sensing-capable range of the magnetism sensing sensor 115 becomes longer in each rotation of the first rotation shaft 111, for example. FIG. 12 shows a relation between the amount of time of sensing by the magnetism sensing sensor 115 and the amount of toner in the first accommodating portion 110*a*.

As shown in FIG. 12, when the amount of toner is no less than a predetermined amount (portion F in FIG. 12), the amount of time of sensing by the magnetism sensing sensor 115 becomes longer in conjunction with the reduction in the amount of toner. The reason is that when the amount of toner in the first accommodating portion 110*a* decreases, the flexing amount of the first flexible sheet 112 decreases, and the first magnet 113 comes nearer to the magnetism sensing sensor 115, as illustrated in FIGS. 10A to 10C. At this time, the amount of toner in the first accommodating portion 110*a* and the amount of time of sensing by the magnetism sensing sensor 115 are proportionate. Accordingly, the image forming apparatus M can acquire (estimate) the amount of toner in the first accommodating portion 110*a* on the basis of the amount of time of sensing of the magnetism sensing sensor 115 by the toner amount acquisition portion.

Conversely, when the amount of toner is no more than the predetermined amount (portion G in FIG. 12), the amount of time of sensing by the magnetism sensing sensor 115 is constant. The reason is that in a case in which the amount of toner T accommodated in the first accommodating portion 110*a* is small, as illustrated in FIG. 10C, even if the amount of toner decreases somewhat, the amount of flexing of the first flexible sheet 112 when the first magnet 113 nears the magnetism sensing sensor 115 hardly changes at all.

According to the cartridge 100 configured as described above, the image forming apparatus M can acquire the amount of toner in the first accommodating portion 110*a* on the basis of the results of sensing by the magnetism sensing sensor 115. The user can then be notified, by notification means such as a monitor or the like that the image forming apparatus M is equipped with, that the amount of toner remaining in the toner cartridge 101 is either scant or is zero, and thereby prompt replacement of the toner cartridge 101 or the cartridge 100. Note that as illustrated in FIGS. 10A to 10C, when the first magnet 113 is located in the sensing-capable range of the magnetism sensing sensor 115, the second magnet 124 is distanced from the magnetism sensing sensor 115, and is located at a position away from this sensing-capable range.

Note that when the amount of toner is no more than the predetermined amount (portion G in FIG. 12), the amount of time of sensing the first magnet 113 by the magnetism sensing sensor 115 does not change even if the amount of toner decreases. The image forming apparatus M may be configured such that the user is notified of the amount of toner in the process cartridge 102 at the point that the amount of toner reaches this predetermined amount. Alternatively, a configuration may be made in which, when the amount of toner is no more than the predetermined amount (portion G in FIG. 12), the amount of toner is acquired (estimated) by another method, such as, for example, estimating the amount of toner consumption from an image pattern. Generally, toner amount sensing methods in which the toner consumption amount is estimated from image patterns tend to accumulate error. However, by combining with the toner amount sensing method that uses magnetism, all that is necessary is to perform calculations regarding just the small amount of toner that is running out in the developer container 110, on the basis of the toner consumption amount, and accordingly the amount of toner can be sensed with high precision until the amount of toner becomes zero.

Method for Improving Position Precision of Magnetism Sensing Sensor

In the first embodiment, a configuration is described in which the magnetism sensing sensor 115 is fixed to the lid 114, but application of the present invention is not limited to such a configuration. The attachment position and attachment method of the magnetism sensing sensor 115 can be changed as appropriate, in accordance with the sensitivity of the magnetism sensing sensor 115, the magnetic forces of the first magnet 113 and the second magnet 124, the positional relation of the first accommodating portion 110*a* and the second accommodating portion 120*a*, and so forth. An attachment method that is capable of improving positional precision of the magnetism sensing sensor 115 will be described below, as an example of the attachment method of the magnetism sensing sensor 115.

Figure 13A:
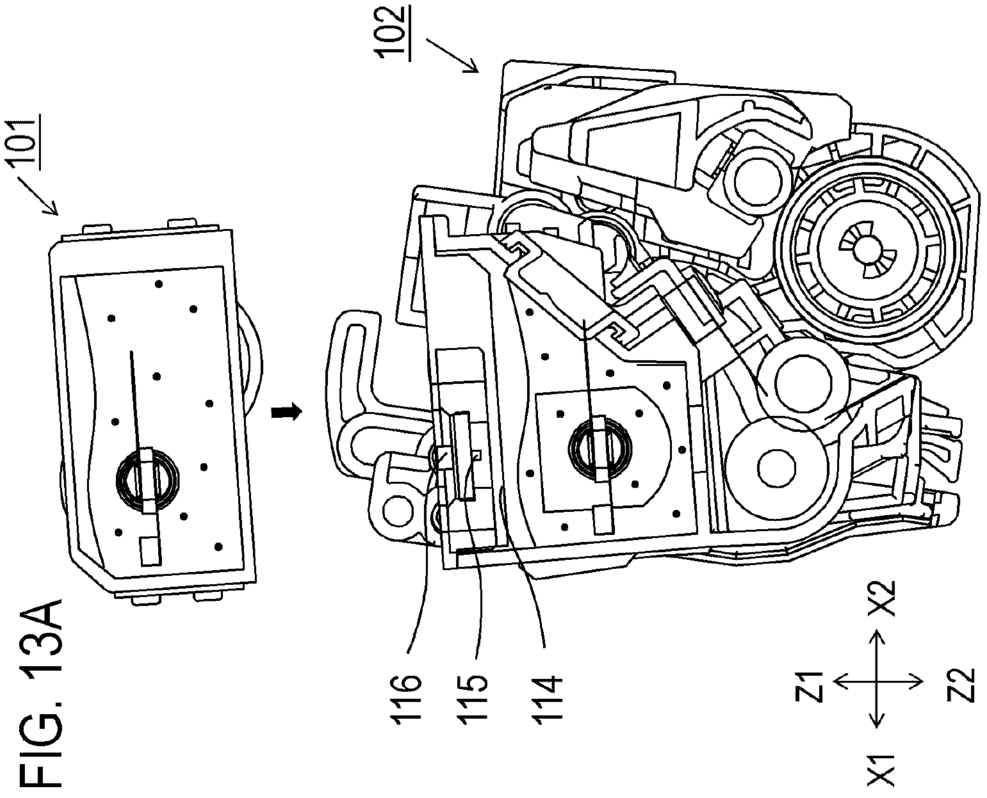
FIGS. 13A and 13B are cross-sectional views of the cartridge according to the first embodiment.
Figure 13B:
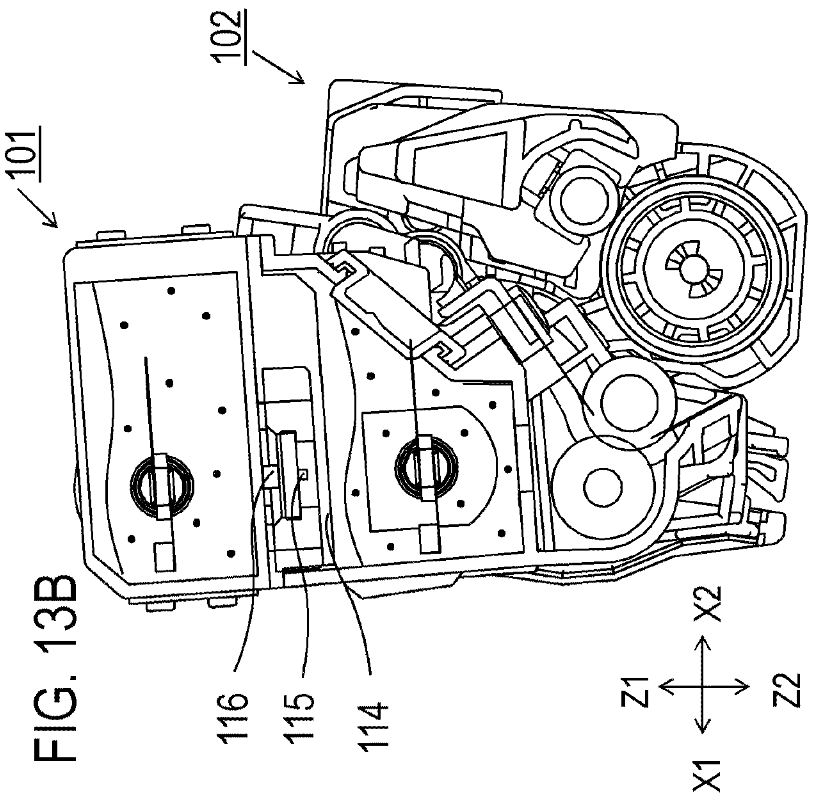
Figure 14:
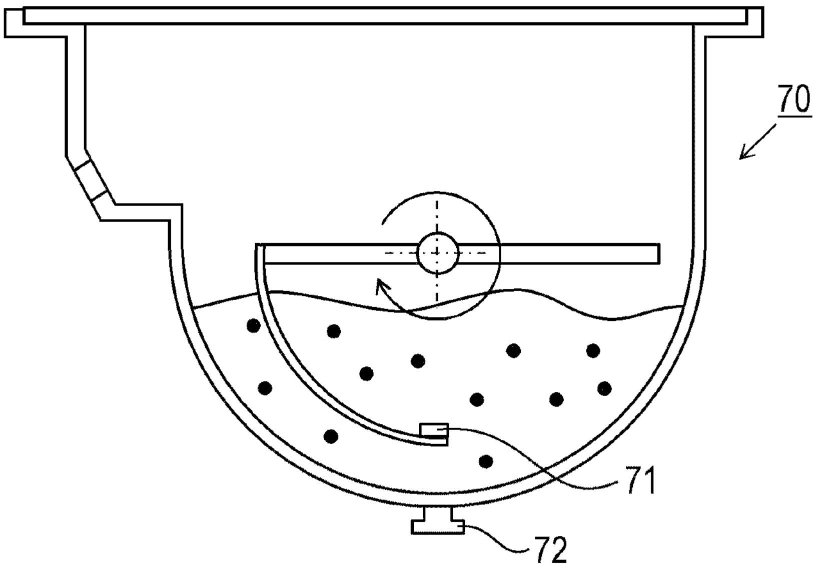
FIG. 14 is an explanatory diagram regarding a conventional configuration.
Figure 15:
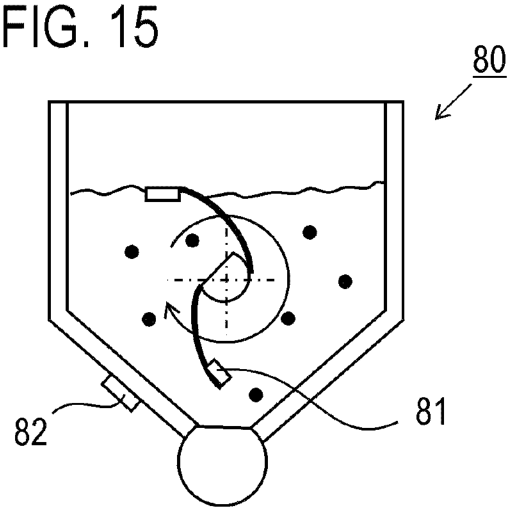
FIG. 15 is an explanatory diagram regarding a conventional configuration.

FIGS. 13A and 13B are cross sectional views of the cartridge 100 illustrating an example of an attachment method of the magnetism sensing sensor 115. FIG. 13A illustrates the toner cartridge 101 in a state of having been removed from the process cartridge 102. FIG. 13B illustrates the toner cartridge 101 in a state of having been attached to the process cartridge 102. In this example, a sensor spring 116 is disposed between the magnetism sensing sensor 115 and the toner cartridge 101. The sensor spring 116 is a biasing member that biases the magnetism sensing sensor 115 toward the process cartridge 102 (first accommodating portion 110*a*) in a state in which the toner cartridge 101 is attached (assembled) to the process cartridge 102. According to such a configuration, the magnetism sensing sensor 115 is positioned in close contact with the toner cartridge 101, and accordingly precision relating to the relative position thereof as to the magnets is improved. Thus, small-sized and inexpensive magnets can be selected.

As described above, according to the above-described configuration, in a small-sized color laser beam printer (LBP) configuration having a paired replenishing configuration divided into a developer container and a toner container, the amount of toner in both the developer container side and the toner container side can be sensed by a single magnetism sensing sensor. Furthermore, a cartridge and an image forming apparatus that perform remaining amount sensing can be provided with a simple configuration and also with conserved space.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2024-027430, filed on Feb. 27, 2024, which is hereby incorporated by reference herein in its entirety.

What is claimed is:

1. A cartridge detachably attachable to an image forming apparatus, the cartridge comprising:

- a first accommodating portion configured to accommodate toner;
- a first rotation shaft provided inside of the first accommodating portion and configured to be rotatable about a first rotation axis line;
- a first flexible member extending in a direction intersecting the first rotation axis line, the first flexible member having a first fixed end that is fixed to the first rotation shaft, and a first free end opposite to the first fixed end in the direction intersecting the first rotation axis line;
- a first magnetized member provided in a region of the first flexible member between the first fixed end and the first free end of the first flexible member, including the first free end;
- a second accommodating portion configured to accommodate toner to be supplied to the first accommodating portion, the second accommodating portion being aligned with the first accommodating portion in a first direction;
- a second rotation shaft provided inside of the second accommodating portion and configured to be rotatable about a second rotation axis line;
- a second flexible member extending in a direction intersecting the second rotation axis line, the second flexible member having a second fixed end that is fixed to the second rotation shaft, and a second free end opposite to the second fixed end in the direction intersecting the second rotation axis line;
- a second magnetized member provided in a region of the second flexible member between the second fixed end and the second free end of the second flexible member, including the second free end; and
- a magnetism sensing sensor provided between the first rotation axis line and the second rotation axis line in the first direction, and configured to sense magnetism in a sensing-capable range.

2. The cartridge according to claim 1, wherein the second accommodating portion is located above the first accommodating portion, in an orientation in which the cartridge is attached to the image forming apparatus.

3. The cartridge according to claim 1, wherein the second magnetized member is located outside of the sensing-capable range in a case in which the first magnetized member is located inside of the sensing-capable range, and wherein the first magnetized member is located outside of the sensing-capable range in a case in which the second magnetized member is located inside of the sensing-capable range.

4. The cartridge according to claim 1, further comprising:

a control portion controlling phases of the first rotation shaft and the second rotation shaft, wherein the first rotation shaft has a first plane to which the first flexible member is fixed, and the second rotation shaft has a second plane to which the second flexible member is fixed, and wherein the control portion controls the phases of the first rotation shaft and the second rotation shaft such that the first plane of the first rotation shaft and the second plane of the second rotation shaft are parallel to each other and also face a same direction.

5. The cartridge according to claim 1, further comprising:

a boundary portion that separates the first accommodating portion and the second accommodating portion from each other, wherein the magnetism sensing sensor is provided at the boundary portion.

6. The cartridge according to claim 5, wherein the boundary portion constitutes an upper face of the first accommodating portion and a lower face of the second accommodating portion, in an orientation in which the cartridge is attached to the image forming apparatus.

7. The cartridge according to claim 5, wherein, in a state in which the first flexible member is not flexing, a distance from the first rotation axis line to the first free end is smaller than a distance from the first rotation axis line to the boundary portion, and wherein, in a state in which the second flexible member is not flexing, a distance from the second rotation axis line to the second free end is smaller than a distance from the second rotation axis line to the boundary portion.

8. The cartridge according to claim 7, wherein the first magnetized member is provided at a position that is closer to the first free end of the first flexible member than to the first fixed end thereof, and wherein the second magnetized member is provided at a position that is closer to the second free end of the second flexible member than to the second fixed end thereof.

9. The cartridge according to claim 5, further comprising:

a developing chamber inside which a toner bearing member configured to bear toner is provided, wherein an opening, through which toner supplied from the first accommodating portion to the developing chamber passes, is formed in the first accommodating portion.

10. The cartridge according to claim 9, further comprising:

a third flexible member extending in a direction intersecting the first rotation axis line, the third flexible member having a third fixed end that is fixed to the first rotation shaft, and a third free end opposite to the third fixed end in the direction intersecting the first rotation axis line; and a fourth flexible member extending in a direction intersecting the second rotation axis line, the fourth flexible member having a fourth fixed end that is fixed to the second rotation shaft, and a fourth free end opposite to the fourth fixed end in the direction intersecting the second rotation axis line.

11. The cartridge according to claim 10, wherein, in a state in which the third flexible member is not flexing, a distance from the first rotation axis line to the third free end is greater than a distance from the first rotation axis line to the opening, and wherein, in a state in which the fourth flexible member is not flexing, a distance from the second rotation axis line to the fourth free end is greater than a distance from the second rotation axis line to an opening which is formed in the second accommodating portion, and through which toner supplied to the first accommodating portion passes.

12. The cartridge according to claim 1, wherein the magnetism sensing sensor is disposed on an imaginary line that passes through the first rotation axis line and the second rotation axis line, as viewed from a direction parallel to the first rotation axis line.

13. The cartridge according to claim 1, wherein the cartridge includes a first cartridge and a second cartridge detachably attached to the first cartridge, the first cartridge having the first accommodating portion, the first rotation shaft, the first flexible member, and the first magnetized member, the second cartridge having the second accommodating portion, the second rotation shaft, the second flexible member, and the second magnetized member.

14. The cartridge according to claim 13, further comprising:

a biasing member that biases the magnetism sensing sensor toward the first accommodating portion in a state in which the second cartridge is attached to the first cartridge.

15. An image forming apparatus, comprising:

an apparatus main body; and a cartridge configured to be detachably attachable to the apparatus main body, the cartridge including a first accommodating portion configured to accommodate toner, a first rotation shaft provided inside of the first accommodating portion and configured to be rotatable about a first rotation axis line;

a first flexible member extending in a direction intersecting the first rotation axis line, the first flexible member having a first fixed end that is fixed to the first rotation shaft, and a first free end opposite to the first fixed end in the direction intersecting the first rotation axis line;

a first magnetized member provided in a region of the first flexible member between the first fixed end and the first free end of the first flexible member, including the first free end;

a second accommodating portion configured to accommodate toner to be supplied to the first accommodating portion, the second accommodating portion being aligned with the first accommodating portion in a first direction;

a second rotation shaft provided inside of the second accommodating portion and configured to be rotatable about a second rotation axis line;

a second flexible member extending in a direction intersecting the second rotation axis line, the second flexible member having a second fixed end that is fixed to the second rotation shaft, and a second free end opposite to the second fixed end in the direction intersecting the second rotation axis line;

a second magnetized member provided in a region of the second flexible member between the second fixed end and the second free end of the second flexible member, including the second free end; and a magnetism sensing sensor provided between the first rotation axis line and the second rotation axis line in the first direction, and configured to sense magnetism in a sensing-capable range.

16. The image forming apparatus according to claim 15, further comprising:

a toner amount acquisition portion configured to acquire an amount of toner in the first accommodating portion and an amount of toner in the second accommodating portion, on the basis of amount of time over which the magnetism sensing sensor has sensed magnetism.

17. An image forming apparatus, comprising:

an image bearing member on which an electrostatic latent image is formed;

a toner bearing member configured to bear toner for developing the electrostatic latent image;

a first accommodating portion that accommodates the toner to be supplied to the toner bearing member;

a first rotation shaft that is provided inside of the first accommodating portion and that is configured to be rotatable about a first rotation axis line;

a first flexible member that extends in a direction intersecting the first rotation axis line, the first flexible member having a first fixed end that is fixed to the first rotation shaft, and a first free end opposite to the first fixed end in the direction intersecting the first rotation axis line;

a first magnetized member that is provided in a region of the first flexible member between the first fixed end of the first flexible member and the first free end thereof, including the first free end;

a second accommodating portion that accommodates toner to be supplied to the first accommodating portion, the second accommodating portion being aligned with the first accommodating portion in a first direction;

a second rotation shaft that is provided inside of the second accommodating portion and that is configured to be rotatable about a second rotation axis line;

a second flexible member that extends in a direction intersecting the second rotation axis line, the second flexible member having a second fixed end that is fixed to the second rotation shaft, and a second free end opposite to the second fixed end in the direction intersecting the second rotation axis line;

a second magnetized member that is provided in a region of the second flexible member between the second fixed end of the second flexible member and the second free end thereof, including the second free end; and a magnetism sensing sensor that is provided between the first rotation axis line and the second rotation axis line in the first direction, and that senses magnetism in a sensing-capable range.

18. A developing apparatus, comprising:

a developing member;

a first accommodating portion configured to accommodate toner;

a first rotation shaft provided inside of the first accommodating portion and configured to be rotatable about a first rotation axis line;

a first flexible member extending in a direction intersecting the first rotation axis line, the first flexible member having a first fixed end that is fixed to the first rotation shaft, and a first free end opposite to the first fixed end in the direction intersecting the first rotation axis line;

a first magnetized member provided in a region of the first flexible member between the first fixed end and the first free end of the first flexible member, including the first free end; and a magnetism sensing sensor configured to sense magnetism in a sensing-capable range, wherein the developing apparatus is configured such that a cartridge is detachably attachable, the cartridge including a second accommodating portion accommodating toner to be supplied to the first accommodating portion, a second rotation shaft provided inside of the second accommodating portion and configured to be rotatable about a second rotation axis line, a second flexible member extending in a direction intersecting the second rotation axis line, the second flexible member having a second fixed end that is fixed to the second rotation shaft, and a second free end opposite to the second fixed end in the direction intersecting the second rotation axis line, and a second magnetized member provided in a region of the second flexible member between the second fixed end and the second free end of the second flexible member, including the second free end, wherein the first accommodating portion is aligned with the second accommodating portion in a first direction, in an orientation in which the cartridge is attached to the developing apparatus, and wherein the cartridge is attached such that the magnetism sensing sensor is located between the first rotation axis line and the second rotation axis line in the first direction.

19. A toner cartridge configured to be detachably attachable to a developing apparatus that includes a developing member, a first accommodating portion configured to accommodate toner, a first rotation shaft provided inside of the first accommodating portion and configured to be rotatable about a first rotation axis line, a first flexible member extending in a direction intersecting the first rotation axis line and having a first fixed end that is fixed to the first rotation shaft, and a first free end opposite to the first fixed end in the direction intersecting the first rotation axis line, a first magnetized member provided in a region of the first flexible member between the first fixed end and the first free end of the first flexible member, including the first free end and a magnetism sensing sensor configured to sense magnetism in a sensing-capable range, the toner cartridge comprising:

a second accommodating portion configured to accommodate toner to be supplied to the first accommodating portion, the second accommodating portion being aligned with the first accommodating portion in a first direction in an orientation in which the toner cartridge is attached to the developing apparatus;

a second rotation shaft provided inside of the second accommodating portion and configured to be rotatable about a second rotation axis line;

a second flexible member extending in a direction intersecting the second rotation axis line, the second flexible member having a second fixed end that is fixed to the second rotation shaft, and a second free end opposite to the second fixed end in the direction intersecting the second rotation axis line; and a second magnetized member provided in a region of the second flexible member between the second fixed end and the second free end thereof of the second flexible member, including the second free end, wherein the magnetism sensing sensor is attached to the developing apparatus so as to be located between the first rotation axis line and the second rotation axis line in the first direction.

* * * * *